(12) United States Patent
Guduru

(10) Patent No.: US 10,988,389 B1
(45) Date of Patent: Apr. 27, 2021

(54) WATER STERILIZATION CAP WITH REMOVABLE CARTRIDGE

(71) Applicant: Microlyscs, LLC, Brooklyn, NY (US)

(72) Inventor: Rakesh Guduru, Weston, FL (US)

(73) Assignee: Microlyscs, Brooklyn, NY (US)

( * ) Notice: Subject to any disclaimer, the term of this patent is extended or adjusted under 35 U.S.C. 154(b) by 0 days.

(21) Appl. No.: 17/151,870

(22) Filed: Jan. 19, 2021

Related U.S. Application Data

(63) Continuation-in-part of application No. 16/874,552, filed on May 14, 2020.

(51) Int. Cl.
| | | |
|---|---|---|
| C02F 1/32 | (2006.01) |
| B65D 47/06 | (2006.01) |
| B65D 51/28 | (2006.01) |
| B65D 51/24 | (2006.01) |
| B65D 47/32 | (2006.01) |
| C02F 1/00 | (2006.01) |
| C02F 1/66 | (2006.01) |
| C02F 1/68 | (2006.01) |
| A45F 3/18 | (2006.01) |

(52) U.S. Cl.
CPC ................ *C02F 1/325* (2013.01); *A45F 3/18* (2013.01); *B65D 47/066* (2013.01); *B65D 47/32* (2013.01); *B65D 51/242* (2013.01); *B65D 51/28* (2013.01); *C02F 1/002* (2013.01); *C02F 1/66* (2013.01); *C02F 1/685* (2013.01); *C02F 2201/3222* (2013.01); *C02F 2303/04* (2013.01); *C02F 2307/02* (2013.01)

(58) Field of Classification Search
CPC .. C02F 1/002; C02F 1/66; C02F 1/685; C02F 1/325; C02F 2201/3222; C02F 2303/04; C02F 2307/02; C02F 1/32; A45F 3/18; B65D 47/066; B65D 47/32; B65D 51/242; B65D 51/28; A61L 2202/16; A61L 2202/23; A61L 2/10
See application file for complete search history.

(56) References Cited

U.S. PATENT DOCUMENTS

| | | | | |
|---|---|---|---|---|
| 8,975,596 | B1 * | 3/2015 | Matthews | C02F 1/325 250/432 R |
| 9,212,067 | B2 * | 12/2015 | Gellibolian | C02F 1/002 |
| 2015/0307368 | A1 * | 10/2015 | Yanke | C02F 1/325 210/660 |
| 2020/0079658 | A1 * | 3/2020 | Weber | C02F 1/002 |

* cited by examiner

*Primary Examiner* — Terry K Cecil
(74) *Attorney, Agent, or Firm* — Weiss & Arons LLP

(57) ABSTRACT

A water sanitization cap for covering a bottle is provided. The cap may screw-fit on a conventional water bottle. The conventional water bottle may store drinking water. The cap may include a UV-C module. When activated, the UV-C module may destroy bacteria and/or viruses within the water. The cap may also include a cartridge. The cartridge may be a filter cartridge, pH modifying cartridge and/or a flavor-enhancing cartridge. The cartridge may filter out particulate matter, modify the pH and/or enhance the flavor of the water when water is being suctioned out of the bottle. The water may be suctioned out of the bottle using a foldaway straw included in the cap.

20 Claims, 20 Drawing Sheets

US 10,988,389 B1

WATER STERILIZATION CAP WITH REMOVABLE CARTRIDGE

CROSS-REFERENCE TO RELATED APPLICATION

This application is a continuation-in-part of non-provisional U.S. patent application Ser. No. 16/874,552, filed on May 14, 2020, entitled "WATER STERILIZATION CAP WITH REMOVABLE PARTICULATE FILTER AND/OR HYDRATION METER," which is hereby incorporated by reference herein in its entirety.

FIELD OF TECHNOLOGY

This disclosure relates to water sterilization and/or modification. Specifically, this disclosure relates to water sterilization and/or modification properties using a bottle cap, such as, for example, a water sterilization cap.

BACKGROUND OF THE DISCLOSURE

Microorganism-free, pathogen-free, virus-free and bacteria-free water is a necessity for human life. Many times, in various locations around the globe, clean, bacteria-free water is unavailable because of a variety of reasons.

Traditionally, this problem has been solved by single-use plastic water bottles. However, as a result, plastic waste from single-use plastic water bottles has grown exponentially. The plastic waste generated by disposed-of single-use plastic water bottles has generated a waste-management problem. Additionally, single-use plastic water bottles may be costly, especially in various locations around the globe.

Therefore, it is desirable to provide an apparatus for sterilizing and/or purifying water retrieved from bio-contaminated sources or sources of unknown contamination levels.

It is further desirable for the apparatus to operate together with typical reusable bottles.

It is yet further desirable for the apparatus to operate as a cap for typical reusable bottles.

SUMMARY OF THE DISCLOSURE

Aspects of the disclosure include sanitizing, flavoring and/or modifying water using both ultraviolet C ("UV-C") rays and a modular cartridge. The modular cartridge may include a filter cartridge, pH modifying cartridge and/or taste enhancing and/or modifying cartridge.

The water may be contained within a conventional reusable bottle. A cap may cover the reusable water bottle.

The cap may include a UV-C module. The UV-C module may shine UV-C rays into the water within the water bottle. The UV-C module may destroy harmful bacteria and viruses within the water.

The cap may also include a cartridge cage. The cartridge cage may hold a cartridge. The cartridge may be disposable.

The cartridge may be a particulate filter. The cartridge may include a particulate filter. The particulate filter may filter water from particulate matter, such as soil, clay, plant debris, animals, biofilms, limescale and any other suitable particulate matter. The particulate filter may also filter water from chemicals, such as nitrogen, bleach, chlorine, fluoride, metals, salts, lead, chloride and any other suitable chemicals.

The particulate filter may be specific to a certain particulate matter. For example, one particulate filter may effectively remove lead from the water, while another particulate filter may effectively remove chloride from the water. Yet another particulate filter may be a universal filter that removes a variety of particulate matter.

The cartridge may be a pH modification cartridge. The cartridge may include pH modification material. The pH modification material may change the pH of the liquid, or water, as it passes through the cartridge.

The cartridge may be a flavor-enhancing and/or flavor-modifying cartridge. The cartridge may include flavor-enhancing or flavor-modifying material. The flavor-enhancing material may infuse flavor into the water when the water passes through the cartridge.

In some embodiments, the cartridge cage may be filled with fruit, such as strawberries, raspberries, lemon, coffee or other flavor-enhancing material. The fruit or other flavor-enhancing material may infuse flavor into the water when the water passes through the cartridge cage. The cartridge cage may be washable to enable the removal of used fruit and insertion of new fruit.

The cartridge may be a carbonation-adding cartridge. As such, a carbonation-adding cartridge may carbonate to the water within a bottle attached to cap. The carbonation-adding cartridge may also carbonate water as it passes through the cartridge.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
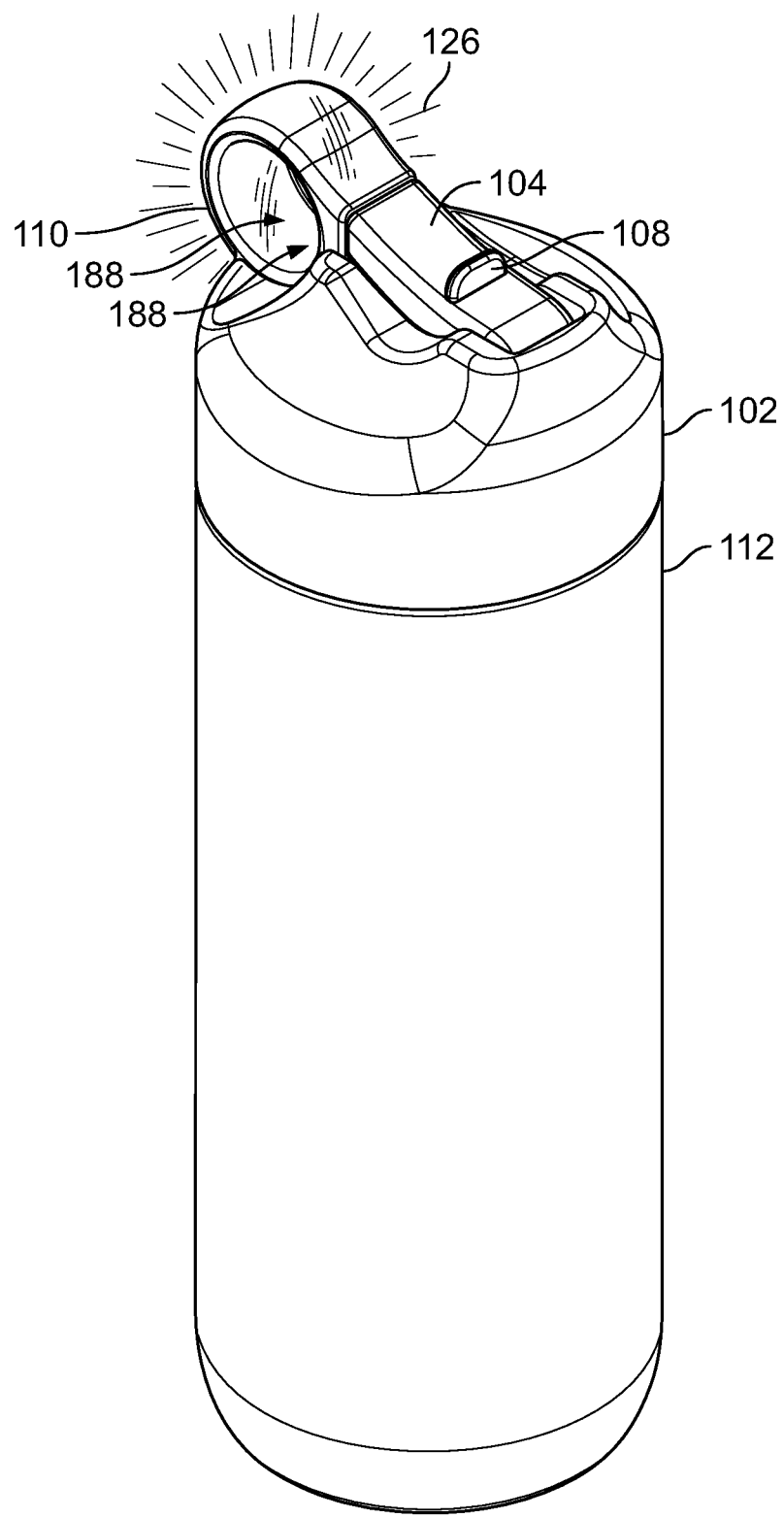
FIG. 1 shows an illustrative top-down perspective view of a cap screwed into a bottle in accordance with embodiments of the disclosure; the top-down perspective view shows a foldaway straw in a closed position.

A water sanitization cap for covering a bottle is provided. The water sanitization cap may include a barrel. The water sanitization cap may also include a shell. The shell may surround at least a portion of the barrel. The shell may have an outer surface and an inner surface.

The cap may also include a waterproof compartment. The waterproof compartment may be formed within the interior of the barrel. The waterproof compartment may include at least one wall. The at least one wall may be formed at least in part from a transparent material. The transparent material may be quartz crystal.

Quartz crystal may be a material that enables UV-C rays to go through it. Any suitable material that allows passage of UV-C rays may be utilized to form a portion of a wall of the waterproof compartment. Such a material may include a flexible silicone material that enables the penetration of UV-C rays.

The cap may also include a light emitting diode ("LED"). The LED may be fixed within the waterproof compartment. The LED may be proximal to one end of the barrel. The LED may be oriented to shine light through the transparent material.

The light emitted from the LED may be ultraviolet ("UV") light ranging between 100 and 400 nm. As such, the LED may be a UV-C LED. A UV-C LED may produce UV-C light, also referred to herein as UV-C rays. UV-C light may be short-wave UV rays in the range of 100-280 nanometers. In some embodiments, the light emitted from the UV-C LED may preferably be about 278 nm.

UV-C rays may penetrate liquids. UV-C rays may penetrate translucent, or partially translucent liquids. UV-C rays may penetrate microbial cells included in liquids and/or translucent liquids. UV-C rays may destroy the active core (nucleic acids) of the microbial cells. The microbial cells may no longer be viable without the active core. After a period of time, the non-active microbial cells may revert to fundamental constituents, such as carbon dioxide ($CO_2$), and trace elements, such as N (Nitrogen), P (Phosphorus), O (Oxygen) and S (Sulfur).

It should be appreciated that the UV-C rays may be produced, by the LED, without the use of toxic mercury. Toxic mercury may be harmful if ingested.

In some embodiments, the cap may include a safety feature to prevent damage from UV-C rays. The safety feature may guard an unprotected eye or skin which may be damaged by UV-C rays. The safety feature may restrict the UV-C LED from being activated unless the cap is secured onto a bottle. The safety feature may include one, two or more pins included in an inner surface of the shell. The one, two or more pins may restrict the UV-C LED from activating unless the pins are depressed. The pins may not be depressed when the cap is detached from a bottle. The pins may be depressed when the cap is screwed onto, or otherwise secured to a bottle.

The cap may also include a sensor. When activated, the sensor may apply a voltage to the LED to cause the LED to emit light.

In some embodiments, sensor may be a touch sensor. The touch sensor may respond to a single touch, double touch, multi-touch or any other suitable predetermined touch pattern. A single touch may initiate the display of the remaining battery charge.

A double touch may initiate activation of the UV-C LED for a first predetermined period of time. The first predetermined period of time may be 30 seconds, 60 seconds, 90 seconds or any other suitable period of time. Exposure of the contents of the bottle to the UV-C LED rays for the first predetermined period of time may be suitable for destroying microbial cells found in liquids from mildly to moderately contaminated sources. Such mildly to moderately contaminated sources may include unfiltered tap water and water from fountains. Exposure of a UV-C LED to a six to one hundred- and twenty-eight-ounce bottle for the first predetermined time period may sterilize the contents of the bottle to 99.99%.

A multi-touch, such as a three, four, five, six or other suitable number of touches, may initiate activation of the UV-C LED for a second predetermined period of time. The second predetermined time period may be 90 seconds, 120 second, 150 seconds, 240 seconds, 360 seconds or any other suitable time period. Exposure of the contents of the bottle to the UV-C LED rays for the second predetermined period of time may be suitable for destroying microbial cells found in liquids from moderately to highly contaminated sources. Such moderately to highly contaminated sources may include water from lakes and ponds. Exposure of a UV-C LED to a 6-128-ounce bottle for the second predetermined time period may sterilize the contents of the bottle to 99.9999%.

The cap may also include a cartridge cage. The filter cage may be operable to hold a cartridge. The cartridge may be a filter cartridge, pH modification cartridge, flavor-enhancing cartridge, any other suitable cartridge or a cartridge that includes one or more of the above-mentioned capabilities. It should be appreciated that the cartridge cage and/or the cartridge may be replaceable. The cartridge cage may include a cartridge cage threaded section.

The water sanitization cap may include a charging site. The charging site may be integral to the shell.

The cap may include a charging site. The charging site may be integral to the shell. As such, a portion of the shell may form the charging site. The charging site may charge a battery located within the cap.

It should be appreciated that the charging site may, in some embodiments, not include a charging port, or at least a readily discernable charging port. Examples of a readily discernable charging port may include a universal serial bus ("USB") port or micro-USB port. For the purposes of this application, port-less may be understood to mean no readily discernable location for the uptake of charging power.

It should be further appreciated that even though the charging site may be port-less, the charging site may utilize a wired connection. In these embodiments, the shell itself may include at least two areas that may conduct electricity. The two areas may be constructed of metal. The first area may be a positive area. The positive area may act a positive charging pole. The second area may be a negative, or ground, area. The negative area may act as a negative charging pole. The positive area and the negative area may be in any suitable shape. An example of a shape may be a ring shape or concentric circle shape. An insulation area may insulate the positive area from the negative area. The insulation area may also be any suitable shape. An example of a suitable shape may be a ring shape. The insulation area may be constructed from an insulating material, such as plastic.

A charger may be used to charge the cap. The charger may be constructed to fit over the shell of the cap. The charger may include a charging terminal. The charging terminal may be built into the inner shell of the charger. The charging terminal may include positive and negative pins. The positive pin may be operable to contact the positive area on the cap. The negative pin may be operable to contact the negative area on the cap. When the charger is fit over the shell, the positive and negative pins may come in contact with the conductive material of the shell of the cap. Once in contact with the positive and negative areas on the cap, the positive and negative pins may charge the battery within the cap. It should be appreciated that the charger may be connected, using a wired connection, or a wireless connection, to a device that provides power. Such a device may include a laptop, electric outlet or any other suitable device.

There may be multiple embodiments for removably and/or fixedly attaching the cartridge cage to the cap. One embodiment may include a snap design in which the cartridge cage snaps into the cap. Another embodiment may include a spring-loaded push design in which the cartridge cage is pushed into the cap.

Yet another embodiment may include a threaded design. There may be multiple embodiments for screwing the cartridge cage into the cap. A first embodiment may include a cartridge cage threaded section on the cartridge cage. The cartridge cage threaded section may be located on the upper outer surface of the cartridge cage. The cartridge cage threaded section on the outer upper surface of the cartridge cage may screw into a shell threaded section on the inner surface of the shell. As such, the cartridge cage threaded section and the shell threaded section may be complimentary to one another.

A second embodiment may include a cartridge cage threaded section on the cartridge cage. The cartridge cage threaded section may be located on the upper inner surface of the cartridge cage. The cartridge cage threaded section on the upper inner surface of the cartridge cage may screw into a barrel threaded section on an upper outer surface of the barrel. The upper outer surface of barrel may be the surface on the external portion of the barrel on the side that furthest from the UV-C LED. As such, the cartridge cage threaded section and the barrel threaded section may be complimentary to one another.

In some embodiments, the barrel may be, in whole, or in part, constructed from plastic. When the UV-C rays are emitted from the LED, micro-cracks may form in the portion of the barrel that is exposed to the light. Therefore, a shield, which may be constructed from a metallic material, such as stainless-steel, may protect the portion of the barrel from being exposed to the UV-C rays. In this way, the barrel is not exposed to, and possibly damaged by, the UV-C rays.

As such, the cap may include a shield. The shield may be stainless-steel. The shield may be constructed from any suitable metallic material. The shield may be constructed from any other suitable material. The shield may be operable to shield the barrel from light generated by the LED.

Additionally, at least a portion of the construction of the cap may be a pressure-fit construction—i.e., the components within the cap may be pressure-fit to one another. For example, the shield may be pressure-fit to the barrel and the barrel may be pressure-fit to the shell. The pressure-fitting may be important because the construction may preferably not include glue. Glue may be undesirable because glue may degrade, and, as the glue degrades, it may leach into the water included in the bottle.

A foldaway straw may be constructed as part of the shell. The foldaway straw may be maintained in either an upright state or in a horizontal state. When the foldaway straw is in the horizontal state, the foldaway straw may partially or completely form a plane that is perpendicular to a longitudinal axis of the bottle.

A flow pipe may connect the foldaway straw, in an upright state, to an annular space between the cartridge cage and the barrel or other suitable location. The flow pipe may directly enable water, under suction, to pass from the flow pipe into the foldaway straw. The flow pipe may indirectly enable water, under suction, to pass from the annular space into the flow pipe.

The shell may also include a cavity. The cavity may store the foldaway straw when the foldaway straw is in the horizontal state. The sensor may fit into the cavity. The sensor may be accessible when the foldaway straw is in the upright state. As such, the sensor may be child resistant because the sensor may be inaccessible when the foldaway straw is in a horizontal position.

The cap may include one or more other sensors. The one or more other sensors may be operable to measure water depth and/or water temperature. The one or more other sensors may be ultrasonic. The one or more sensors may be built-in probes, such as temperature probes. In some embodiments, the one or more other sensors may constantly remain active. In certain embodiments, the one or more other sensors may determine water data after a predetermined period of time has lapsed. The predetermined period of time may be thirty seconds, one minute, five minutes, thirty minutes or any other suitable time period. In other embodiments, the sensor may determine water data each time the cap is replaced on the bottle. The one or more sensors may be also be known as a hydration meter, as it measures the user's hydration.

Smart logic programming along with sensor calibration may enable the detection of false readings to avoid anomalies. For example, the sensor may determine when the cap is not placed on the bottle. Also, the sensor may determine when the level of the contents is not static, such as during transportation.

The cap may also include a transceiver. The transceiver may transmit and/or receive data from an associated device. The device may be a smartphone, computer, tablet or other suitable device. The transceiver may connect to the device using Bluetooth®, Wi-Fi, or any other suitable communication protocol. The transceiver may transmit water depth, water temperature and/or water sterilization status data to the device. The device may use the received water depth, water temperature and/or water sterilization status data to determine a user's total water consumption.

The device may include an application. The application may receive the water depth, water temperature and/or water sterilization status data. The application may combine the received water depth, water temperature and/or water sterilization status data with timestamp and/or geotagging data determined by the application. The combined data may enable the application to determine water consumption over a period of time, a specific time period and/or a day. The combined data, specifically the geotagging data may help calculate the water consumption when traveling or water consumption at a specific location. The application, based on the data, may instruct a user regarding hydration. Such instruction may include instructing a user to drink more water during specific times during the day and/or at specific locations. Such instruction may display to a user to the difference between water consumption at various geographic locations. For example, such instruction may display to a user the difference between water consumption at home and water consumption at an office location.

In some embodiments, the water sanitization cap may be used to sanitize surfaces, such as a keyboard, mouse, tablet, etc. In such embodiments, the cap may be waved within a predetermined proximity of the surface, e.g., one inch, two inches, three inches of four inches. The waving may be executed for a predetermined amount of time such as one minute or two minutes.

Apparatus described herein are illustrative. Apparatus in accordance with this disclosure will now be described in connection with the figures, which form a part hereof. The figures show illustrative features of apparatus in accordance with the principles of this disclosure. It is to be understood that other embodiments may be utilized and that structural, functional and procedural modifications may be made without departing from the scope and spirit of the present disclosure.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

FIG. 1 shows an illustrative top-down perspective view of an exemplary hybrid sterilization cap. The exemplary sterilization cap is shown, in FIG. 1, screwed into bottle 112. The hybrid sterilization cap may combine content/bottle sterilization via UV light and particulate filtering, chemical filtering, pH modifying and flavor-enhancing via a preferably modular cartridge cage that holds a modular replaceable cartridge.

The hybrid sterilization cap may include multiple components. Table A includes an exemplary list of components that may be included in the hybrid sterilization cap. It should be appreciated that more components or less components than those included in table A may be included in the hybrid sterilization cap.

TABLE A

| | |
|---|---|
| top portion of cap/shell | 102 |
| foldaway straw | 104 |
| cavity to store foldaway straw | 106 |
| finger tab on foldaway straw | 108 |
| finger ring | 110 |
| bottle | 112 |
| inner portion of bottle | 114 |
| micro-USB port | 116 |
| tab to cover micro-USB port | 118 |
| right screw | 120 |
| left screw | 122 |
| protrusion on finger ring to secure foldaway straw | 124 |
| illumination lines | 126 |
| button/touch sensor | 128 |
| LED ring around button/touch sensor | 130 |
| cylindrical element | 132 |
| screws to hold elements | 134 |
| cylindrical plate | 136 |
| element above PCB board | 138 |
| PCB board | 140 |
| gasket | 142 |
| battery | 144 |
| connector between battery and PCB-A board | 146 |
| PCB-A board | 148 |
| PCB pod/inner barrel | 150 |
| quartz crystal | 152 |
| shield - first portion | 154 |
| shield - second portion | 156 |
| component with vent hole and flow pipe entry | 158 |
| inner portion of cap and barrel | 160 |
| sealing o-ring 1 (outer ring) | 162 |
| sealing o-ring 2 (inner ring) | 164 |
| cover of cartridge cage | 166 |
| cartridge (internal portion) | 168 |
| screwable cartridge cage | 170 |
| UV-C LED | 172 |
| threads on cap to screw into bottle | 174 |
| threads on cartridge cage to screw into cap | 176 |
| threads on cap to screw into cartridge cage | 178 |
| vent hole | 180 |
| track for vent hole | 182 |

TABLE A-continued

| | |
|---|---|
| flow pipe | 184 |
| space where bottle is screwed into, or can be screwed into, cap | 186 |
| locations on finger ring where LEDs are located underneath | 188 |
| USB port cover handle | 190 |
| cutaway on foldaway straw to allow vent hole to open | 192 |
| flow pipe within foldaway straw | 194 |
| mesh surrounding inner portion of cartridge | 196 |
| barrel | 198 |

One component included in the hybrid sterilization cap may be a top portion of the cap. The top portion of the cap may also be referred to herein as shell 102. Another component may be a barrel (not shown in FIG. 1). Shell 102 may encapsulate all or a portion of the barrel.

The sterilization cap may be constructed from metallic materials, stainless steel materials, glass materials, quartz glass materials, silicon materials, silicone materials, plastic materials and/or any other suitable materials or a combination thereof. In some embodiments, at least a portion of shell 102 may be constructed from plastic materials. In certain embodiments, the barrel may be constructed at least partially from plastic materials.

The sterilization cap may include threads on the inner portion of shell 102. The threads on the inner portion of shell 102 is shown at 174 (obscured from view in FIG. 1). The threads on the inner portion of shell 102 may screw into bottle 112.

Bottle 112 may be constructed from metallic materials, glass materials, plastic materials, insulating materials or any other suitable materials. Bottle 112 may insulate its contents in order to maintain a temperature of the bottle contents within a predetermined range for more than a predetermined amount of time.

The sterilization cap may also include a foldaway straw 104. Foldaway straw 104 may be positioned in an open state or in a closed state. In an open state, foldaway straw 104 may be deployed for use. As such, when the foldaway straw is in an open state, a user may suck through foldaway straw 104 to obtain the contents of bottle 112. In a closed state, foldaway straw 104 may be undeployed. As such, in a closed state, foldaway straw 104 may be folded into the cavity formed by a hollow in shell 102. The hollow is not shown in FIG. 1 because the foldaway straw is shown in a closed state and is therefore located within the hollow. When foldaway straw 104 is in a closed state, the contents of bottle 112 may be blocked from exiting through foldaway straw 104. Finger tab 108 may enable a user to push foldaway straw from an open position to a closed position. Finger tab 108 may also enable a user to pull foldaway straw from a closed position to an open position.

The hybrid sterilization cap may also include finger ring 110. Finger ring 110 may be constructed from any of the aforementioned materials or any combination of more than one of the materials. In some embodiments, finger ring 110 may be constructed from a transparent material, such as plastic. Finger ring 110 may be constructed separately from shell 102. Because finger ring 110 may be constructed from its own distinct material, finger ring 110 may be constructed to be substantially transparent with a reflective inner surface. Finger ring 110 may be attached to shell 102 after the completion of the individual construction of both finger ring 110 and shell 102.

Light emitting diodes ("LEDs") may be placed at locations 188 on shell 102 underneath the ring. Because finger ring 110 is constructed from a transparent material with a reflective inner surface, finger ring 110 may illuminate when LEDs at locations 188 are turned on.

In some embodiments, the LEDs may be located in other locations, such as on the side of the finger ring. The LEDs may be located in any location that enables the LEDs to transmit light through the finger ring.

The illumination may involve various illuminative properties. The illuminative properties may include color variations, such as one color, multiple colors or any other suitable combination of colors as well as the ability to select colors and/or change colors. The illuminative properties may also include the ability to select illumination strength variations, such as full strength, medium strength, glow or any suitable strength or combination of strengths. The illuminative properties may also include the ability to select whether the light is flashing or blinking. For example, the illumination may be selectable between a steady light, a slow-blinking light, a medium-blinking light and/or a fast-blinking light.

The illumination may be based on different factors, such as contents temperature, contents sterilization status, contents weight, contents flavor, user hydration status or any other suitable factor.

It should also be appreciated that, because finger ring 110 may be constructed separately from shell 102, finger ring 110 may be easily removable, swap-able and/or interchangeable. Therefore, finger ring 110 may be easily customizable. For example, laser etching may be used to etch a name or logo onto the substrate of finger ring 110.

When finger ring 110 is illuminated, the name and/or logo may be displayed clearly. Also, the colors of the LEDs underneath finger ring 110 may be changeable and/or user selectable to match a color scheme, such as an entity color scheme or entity logo colors.

Illumination lines 126 show illumination of finger ring 110. Illumination lines 126 may be various colors, blinking interval lengths, light strengths and/or any other suitable properties.

Figure 2:
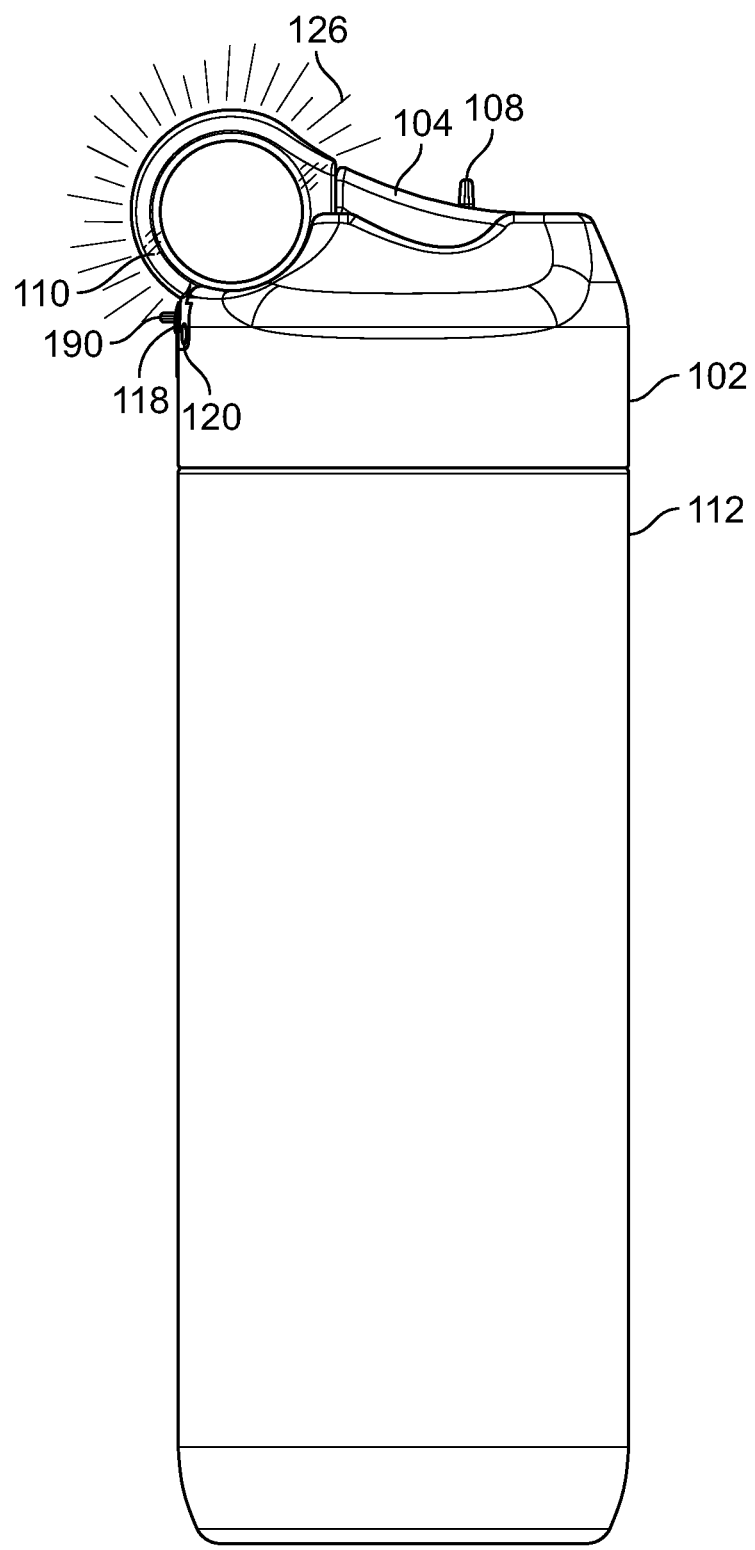
FIG. 2 shows an illustrative side view of the cap screwed into a bottle in accordance with embodiments of the disclosure; the side view shows a foldaway straw in a closed position.

FIG. 2 shows a side view of a sterilization cap screwed into bottle 112. The sterilization cap may also include a micro universal serial bus ("USB") port. The micro-USB port (labeled 116 but not shown in FIG. 2) may be covered by a tab 118 to cover the micro-USB port. Handle 190 may be included in tab 118. Handle 190 may enable a user to open and close tab 118 to access the micro-USB port. A micro-USB charging cord (not shown) may be plugged into the micro-USB port. The micro-USB charging cord may plug into both the micro-USB port and a charging source such as an outlet. The micro-USB port may provide power to a rechargeable battery 144 (see FIG. 15) included in the sterilization cap.

Finger ring 110 may be screwed into shell 102 with two screws. A first screw 120 may be placed to the right of micro-USB port 116. A second screw 122 (not shown in FIG. 2) may be located to the left of micro-USB port 116. Any suitable number of screws may be used to screw finger ring 110 to shell 102.

Figure 3:
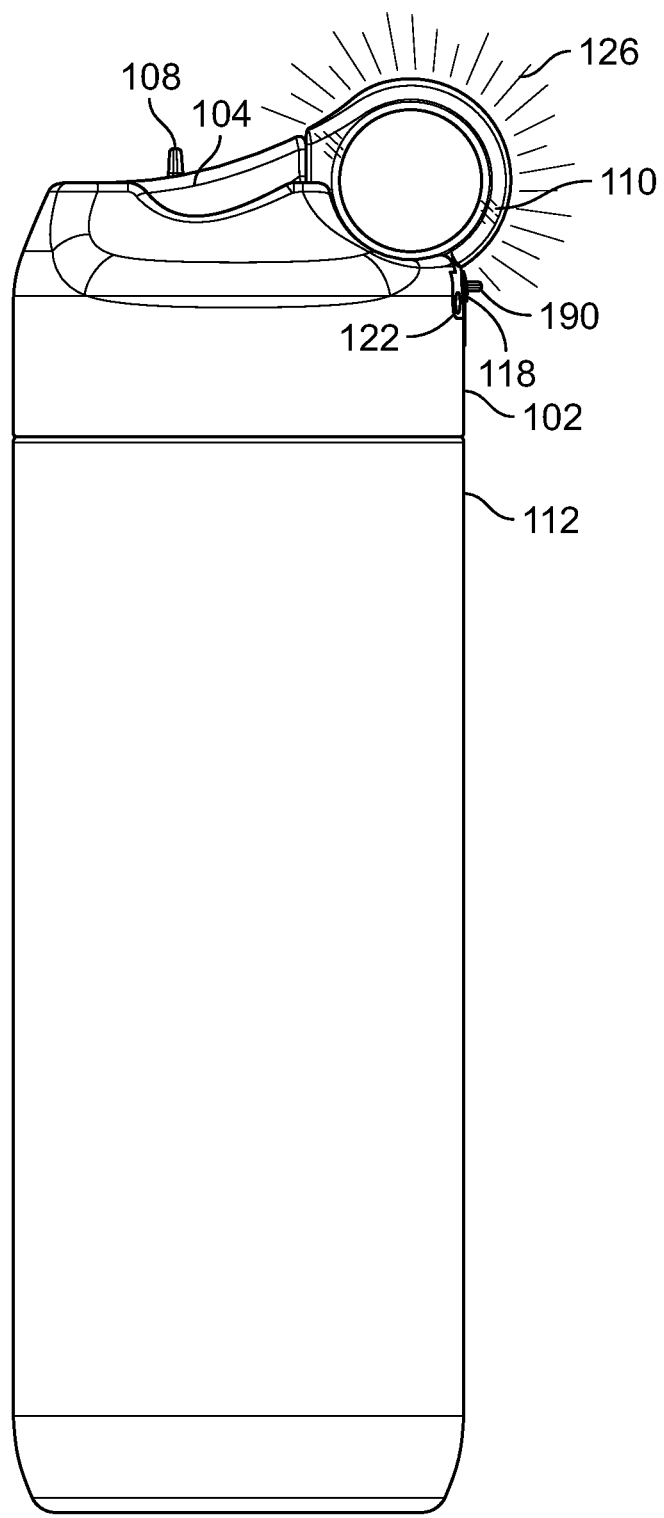
FIG. 3 shows another illustrative side view of a cap screwed into a bottle in accordance with embodiments of the disclosure; the side view shows a foldaway straw in a closed position.

FIG. 3 shows another side of the sterilization cap and bottle shown in FIG. 2. In FIG. 3, screw 122, used to secure finger ring 110 is shown.

Figure 4:
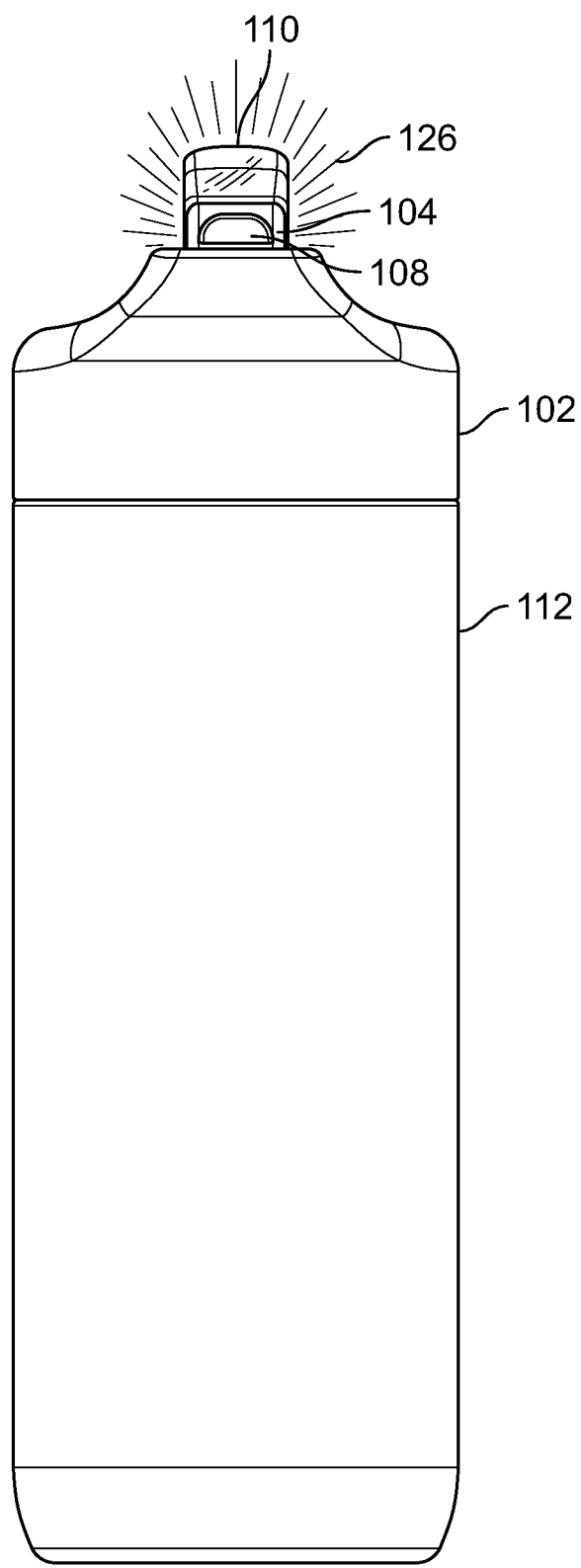
FIG. 4 shows yet another illustrative side view of a cap screwed into a bottle in accordance with embodiments of the disclosure; the side view shows a foldaway straw in a closed position.

FIG. 4 shows yet another side view of the sterilization cap and bottle 112 shown in FIG. 2 and FIG. 3. In FIG. 4, foldaway straw 104 is shown in a closed position. As such, finger ring 110 is visible when viewing the sterilization cap from the side view shown in FIG. 4.

Figure 5:
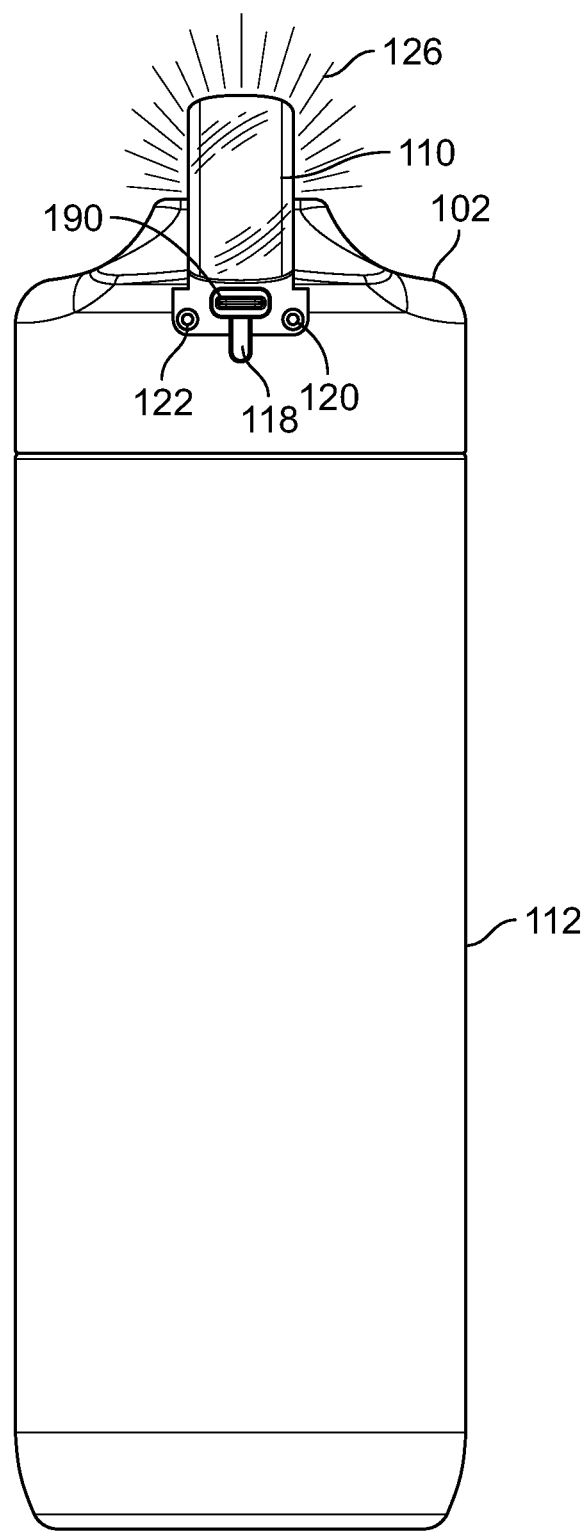
FIG. 5 shows still another illustrative side view of a cap screwed into a bottle in accordance with embodiments of the disclosure; the side view shows a foldaway straw in a closed position.

FIG. 5 shows another side view of the sterilization cap screwed into bottle 112. In FIG. 5, the finger ring 110 is shown screwed into shell 102 using screws 120 and 122. Also, tab 118 to cover micro-USB port is shown. Micro-USB port cover 190 is shown attached to tab 118.

Figure 6:
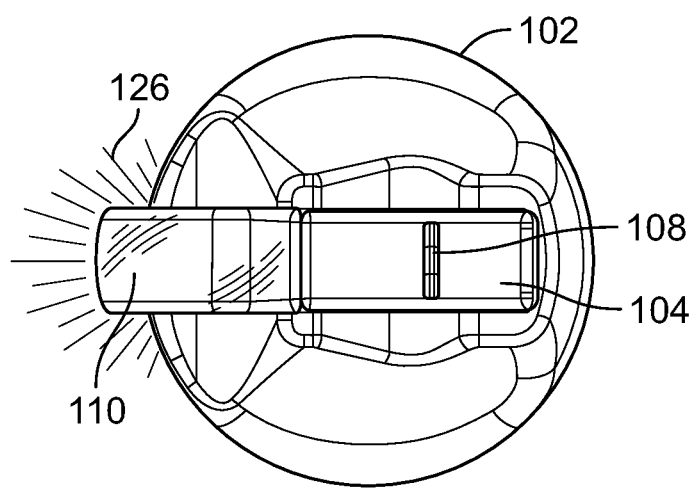
FIG. 6 shows an illustrative top view of a cap in accordance with embodiments of the disclosure; the top view shows a foldaway straw in a closed position.

FIG. 6 shows a top view of the sterilization cap. The top view shown in FIG. 6 shows the foldaway straw in a closed position.

Figure 7:
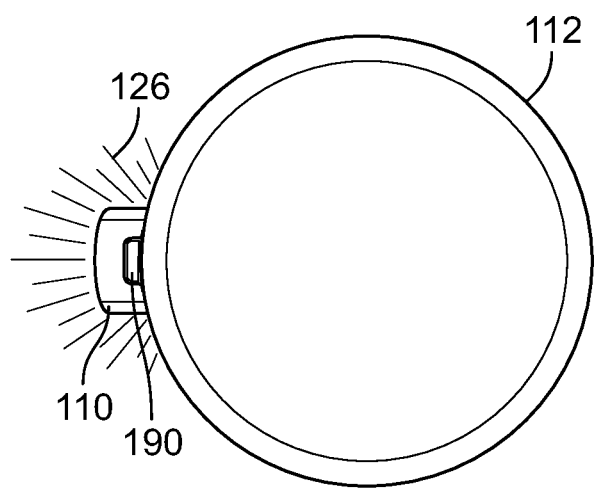
FIG. 7 shows an illustrative bottom view of a cap screwed into a bottle in accordance with embodiments of the disclosure.

FIG. 7 shows a bottom view of the sterilization cap screwed into bottle 112. When viewed from the bottom, finger ring 110 may be viewable. Micro-USB port cover handle 190 may also be viewable. Foldaway straw 104 may be viewable from the bottom when in an open state. However, foldaway straw 104 from the bottom may not be viewable when in a closed state.

Figure 8:
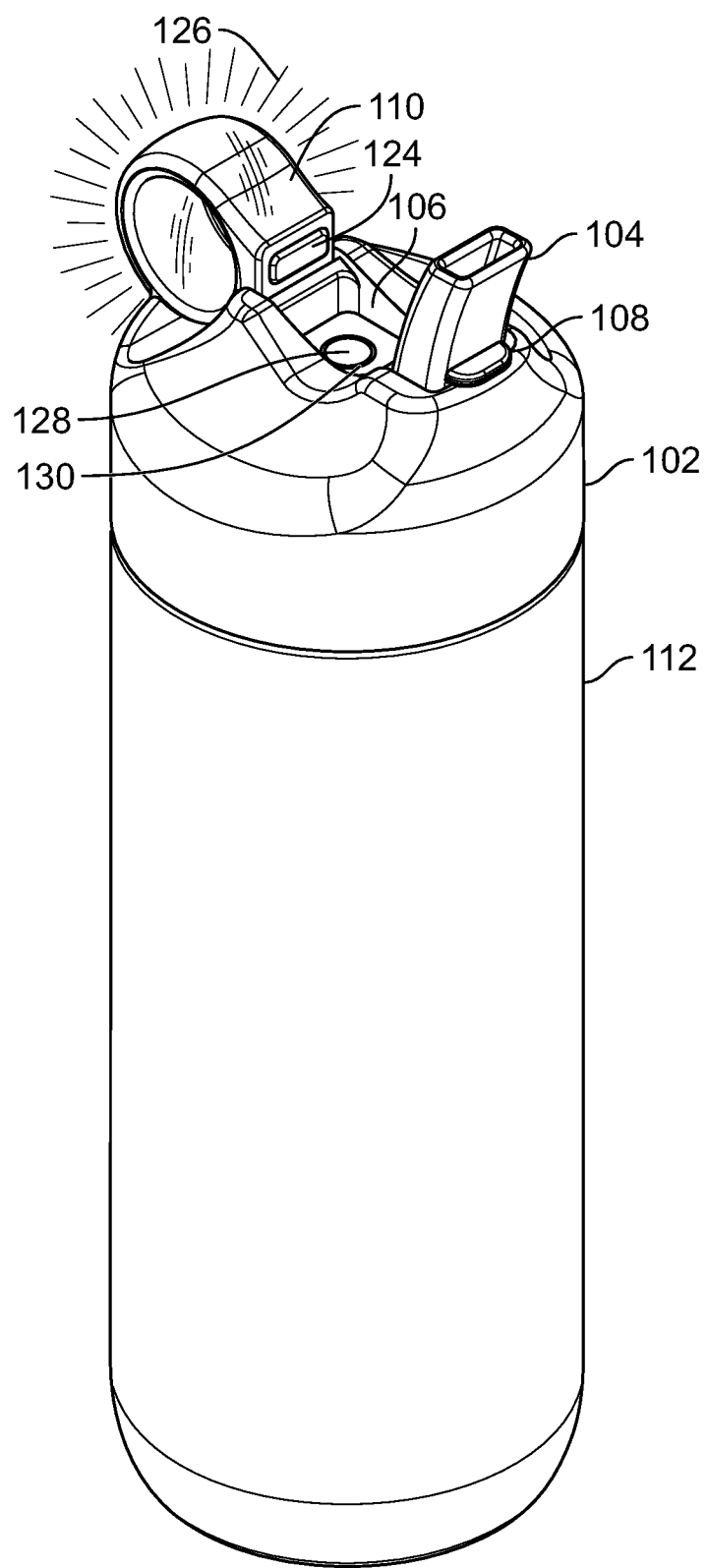
FIG. 8 shows an illustrative top-down perspective view of a cap screwed into a bottle in accordance with embodiments of the disclosure; the top-down perspective view shows a foldaway straw in an open position.

FIG. 8 shows a top-down perspective view of the sterilization cap screwed into bottle 112. Foldaway straw 104 is shown in an open state in FIG. 8.

A user may utilize finger tab 108 to change the position of foldaway straw 104 from a closed position to an open position. When foldaway straw 104 is in an open position, cavity 106, which is used to hold foldaway straw in a closed position, is viewable. Button/touch sensor 128 may be included within cavity 106. Button/touch sensor 128 may be used to activate a UV-C LED (labeled 172, not shown in FIG. 8, but shown for example, in FIG. 14). Ring 130 may surround button/touch sensor 128. Ring 130 may be an LED ring. Ring 130 may illuminate to indicate the UV-C LED status, the battery status and/or any other suitable reason. For example, if the UV-C LED is activated, ring 130 may illuminate a predetermined color. The illumination of ring 130 may be in addition to the illumination of finger ring 110. In some embodiments, the illuminative properties of ring 130 may mirror the illuminative properties of finger ring 110.

Finger ring 110 may also include protrusion 124. Protrusion 124 may hold foldaway straw 104 in place when foldaway straw 104 is in a closed state.

Figure 9:
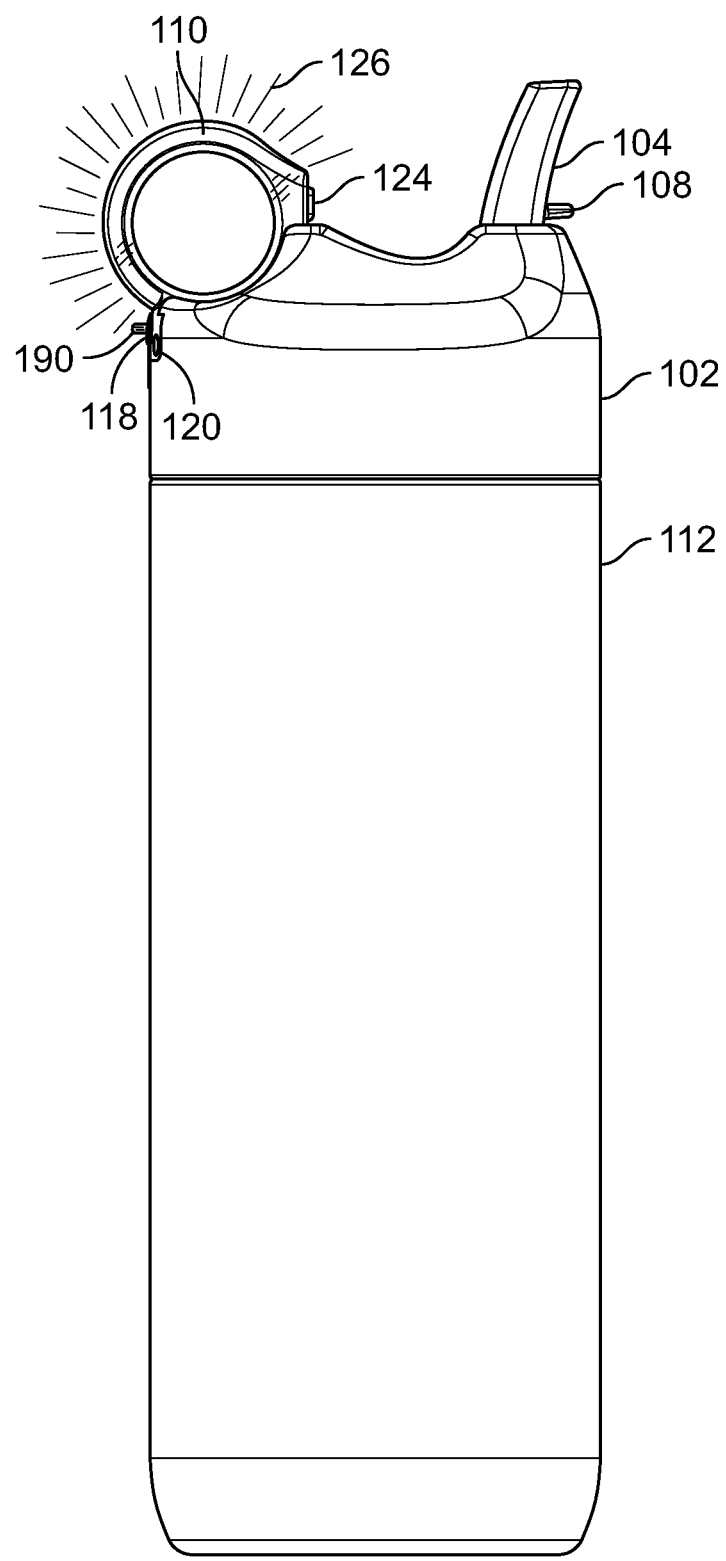
FIG. 9 shows an illustrative side view of a cap screwed into a bottle in accordance with embodiments of the disclosure; the side view shows a foldaway straw in an open position.

FIG. 9 shows a side view of the hybrid sterilization cap screwed into bottle 112. The side view shows foldaway straw 104 in an open state.

Figure 10:
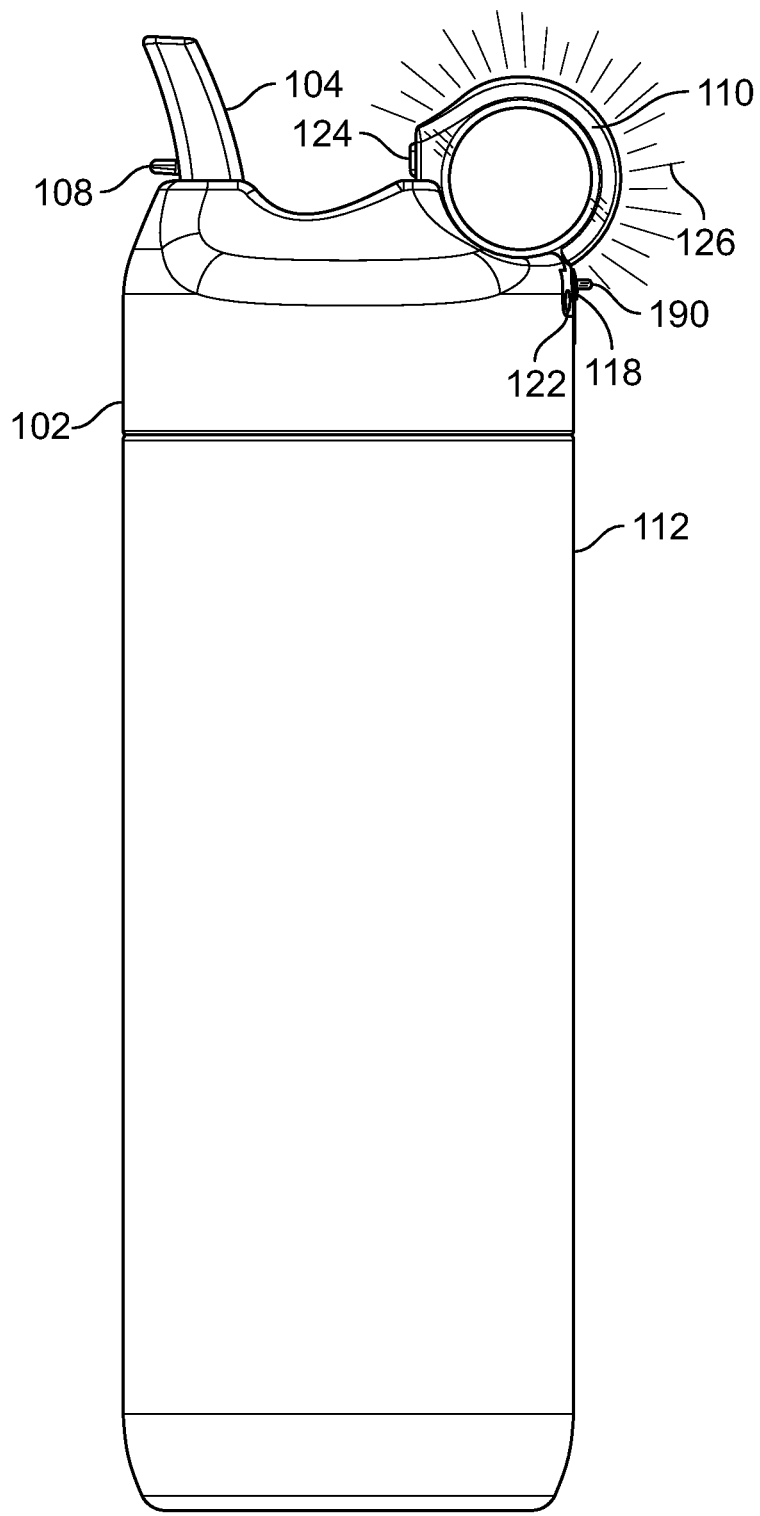
FIG. 10 shows another illustrative side view of a cap screwed into a bottle in accordance with embodiments of the disclosure; the side view shows a foldaway straw in an open position.

FIG. 10 shows another side view of the hybrid sterilization cap screwed into bottle 112. The side view shows foldaway straw 104 in an open state.

Figure 11:
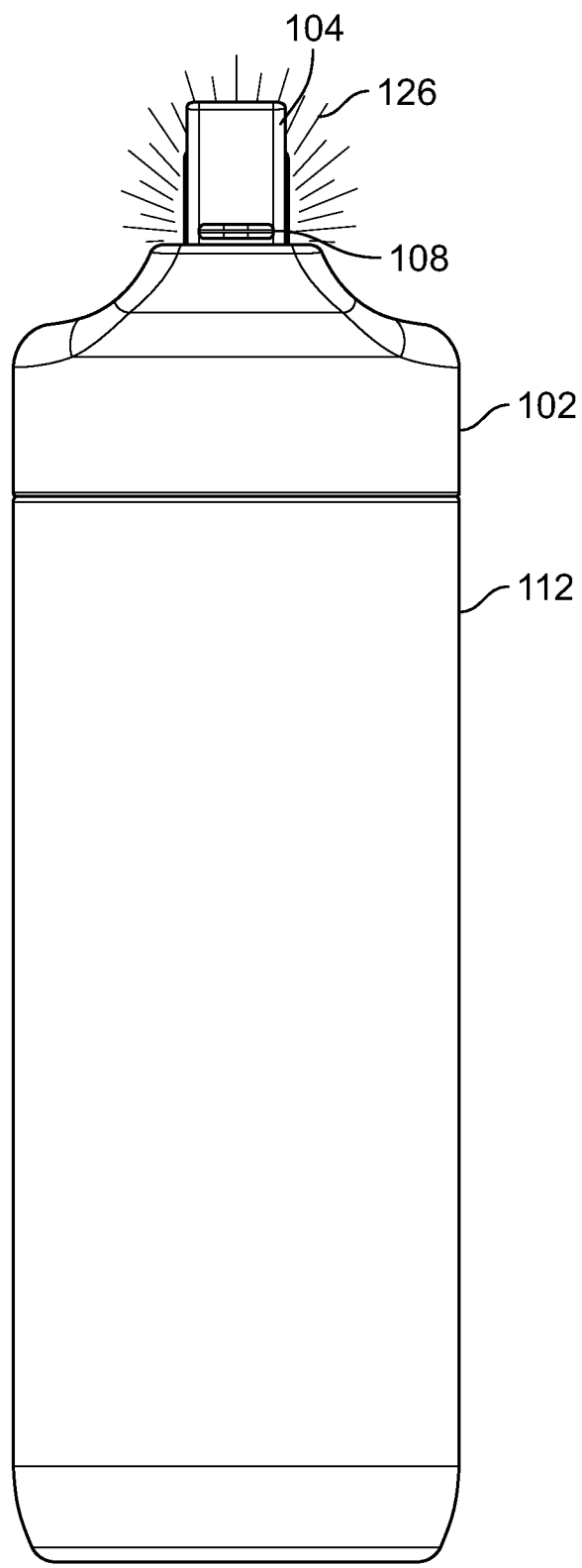
FIG. 11 shows yet another illustrative side view of a cap screwed into a bottle in accordance with embodiments of the disclosure; the side view shows a foldaway straw in an open position.

FIG. 11 shows another side view of the hybrid sterilization cap screwed into bottle 112. The side view shows foldaway straw 104 in an open state.

Figure 12:
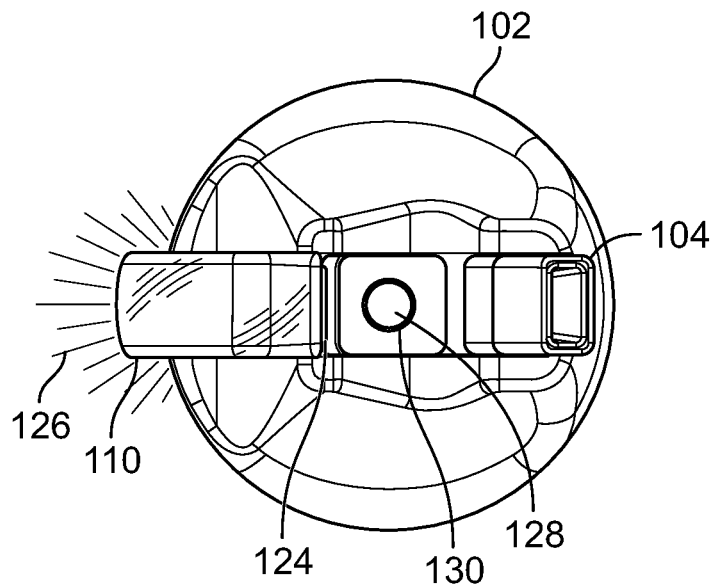
FIG. 12 shows an illustrative top view of a cap in accordance with embodiments of the disclosure; the top view shows a foldaway straw in an open position.

FIG. 12 shows a top view of the hybrid sterilization cap. The top view shows foldaway straw 104 in an open state. Button/touch sensor 128 is viewable from the top view. Ring 130 surrounds button/touch sensor 128.

Figure 13:
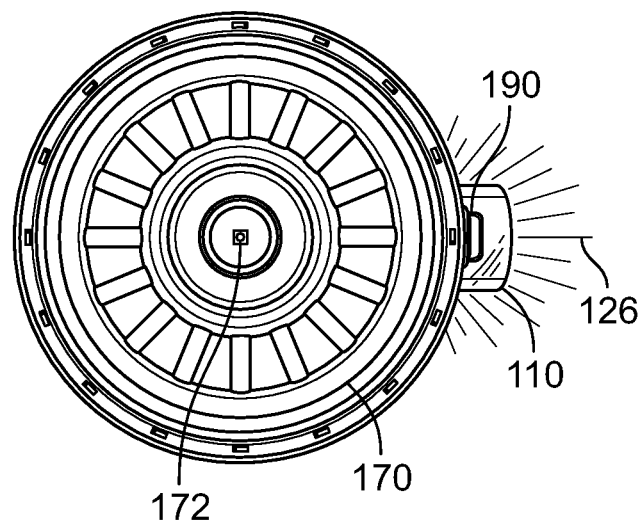
FIG. 13 shows an illustrative bottom view of a cap in accordance with embodiments of the disclosure.

FIG. 13 shows a bottom view of the hybrid sterilization cap. In FIG. 13, the bottle is not shown. Screwable cartridge cage 170 is shown screwed into the barrel (shown in FIG. 19). UV-C LED 172 is shown at the bottom center of the hybrid sterilization cap, although other placements of UV-C LED 172 are also possible to the extent that these other placements enable the UV-C LED light to be used to sterilize water in the bottle.

Figure 14:
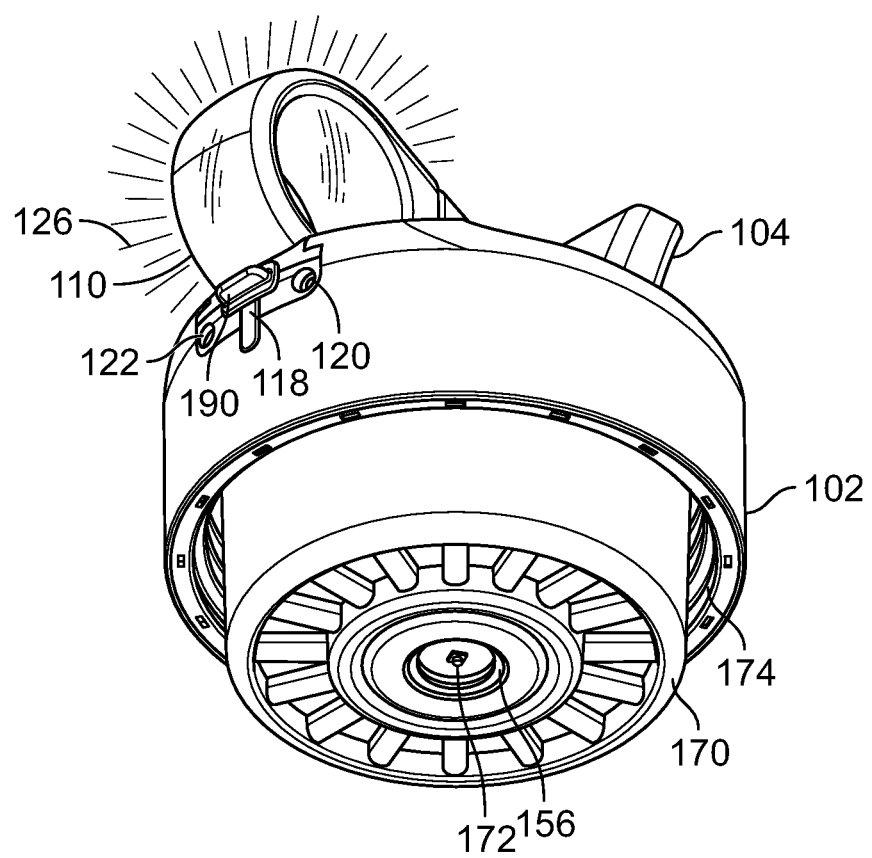
FIG. 14 shows an illustrative bottom perspective view of a cap in accordance with embodiments of the disclosure.

FIG. 14 shows a bottom perspective view of the hybrid sterilization cap. Screwable cartridge cage 170 is shown screwed into the barrel (shown in more detail in FIG. 19). Threads 174, which may be used to screw the cap into a bottle are shown.

When the UV-C rays are emitted from UV-C LED these rays may over time cause micro-cracks to form in the plastic that is exposed to the UV-C rays. Shield 156, which may be constructed from a metallic material, such as stainless-steel, may protect the portion of the barrel from being exposed to the UV-C rays. In this way, the barrel and cartridge cage 170 is not exposed to, and possibly damaged by, the UV-C rays. It should be appreciated that shield portions 154 and 156 may be constructed from any suitable material that protects the barrel and the cartridge cage from UV-C LED rays.

It should be noted that the shield may be constructed from one or more portions. As shown in the cutaway view, the shield may include first portion 154 and second portion 156. First portion 154 and/or second portion 156 may be constructed from plastic, silicon, silicone, stainless steel or any other suitable material. In some embodiments, first portion 154 may be preferably constructed from plastic, silicon and/or silicone and second portion 156 may be constructed from stainless steel.

Figure 15:
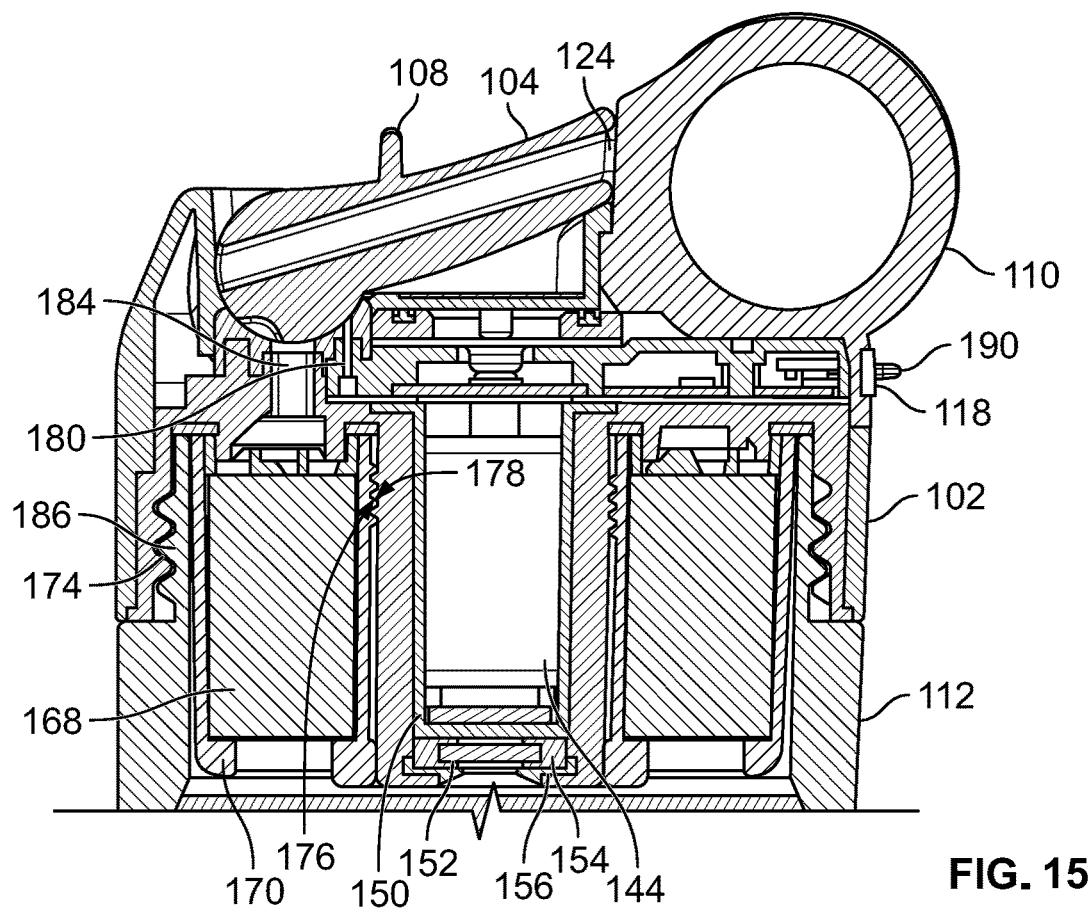
FIG. 15 shows an illustrative cutaway view of a cap screwed into a top portion of a bottle in accordance with embodiments of the disclosure.

FIG. 15 shows an illustrative cutaway view of the hybrid sterilization cap screwed into bottle 112 (shown partially). Foldaway straw 104 is shown in a closed position. Foldaway straw 104 may be held in the closed position by protrusion 124 included on finger ring 110.

Handle 190 may be attached to micro-USB port tab 118. When micro-USB port tab is opened, micro-USB port 116 (not shown) may be accessible. A micro-USB charging cord with a micro-USB adapter may be used to charge battery 144.

Quartz crystal 152 may cover the UV-C LED (not shown in FIG. 15). Quartz crystal 152 may be a transparent material that enables transmission therethrough by UV-C LED rays. As such, the UV-C LED may remain in the waterproof compartment of the barrel and be able to transmit rays into the contents of bottle 112.

Inner portion of the barrel/PCB pod is shown at 150.

Threads 178 may be included on the outer surface of the barrel. Threads 178 may enable screwable cartridge cage 170 to screw onto the barrel. Threads 176 may be included on screwable cartridge cage 170. Threads 176 may enable the screwable cartridge cage 170 to screw onto the barrel.

The cartridge 168 is shown encased by screwable cartridge cage 170. Screwable cartridge cage 170 may be covered by cover 166. Space 186 may be a space where bottle 112 is screwed into or can be screwed into threads 174 on the cap.

Flow pipe 184 may be a pipe that enables water to be drawn from bottle 122 through cartridge 168 and up into foldaway straw 104. Vent hole 180 may enable venting so that the water can pass up into flow pipe 184 easily.

Figure 16:
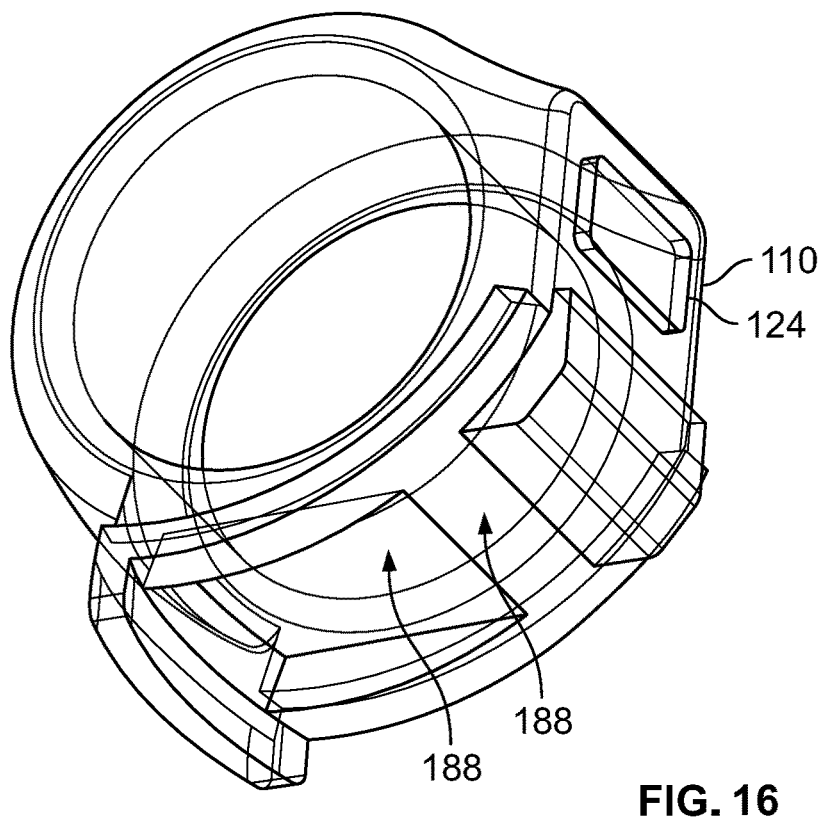
FIG. 16 shows an illustrative perspective view of a finger ring for attachment to a cap in accordance with embodiments of the disclosure.

FIG. 16 shows an illustrative enlarged view of finger ring 110. Finger ring 110 may include protrusion 124. Most of the load of the bottle may be carried by finger ring 110, when screwed into shell 102. Locations 188 may be the locations of the LEDs located on shell 102 which are used to illuminate finger ring 110.

Figure 17:
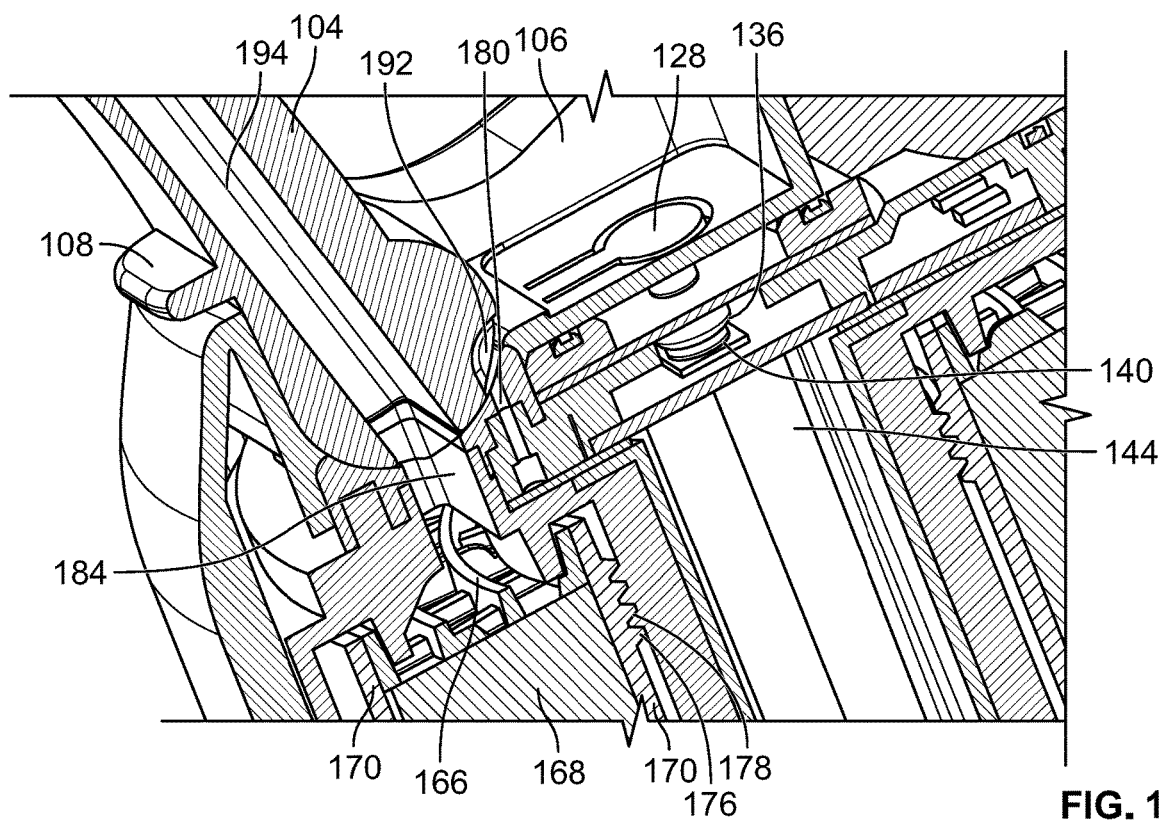
FIG. 17 shows an illustrative cutaway view of a portion of a cap in accordance with embodiments of the disclosure; the cutaway view showing a foldaway straw in an open position.

FIG. 17 shows an illustrative partial cutaway view of the hybrid sterilization cap with the foldaway straw 104 in an open position. As shown, when foldaway straw is in an open position, cutaway 192 on foldaway straw enables vent hole 180 to remain open. Also, flow pipe 194 within foldaway straw 104 is shown connected to flow pipe 184.

In addition, cylindrical plate 136, PCB board 140 and battery 144 are shown in FIG. 17.

Figure 18:
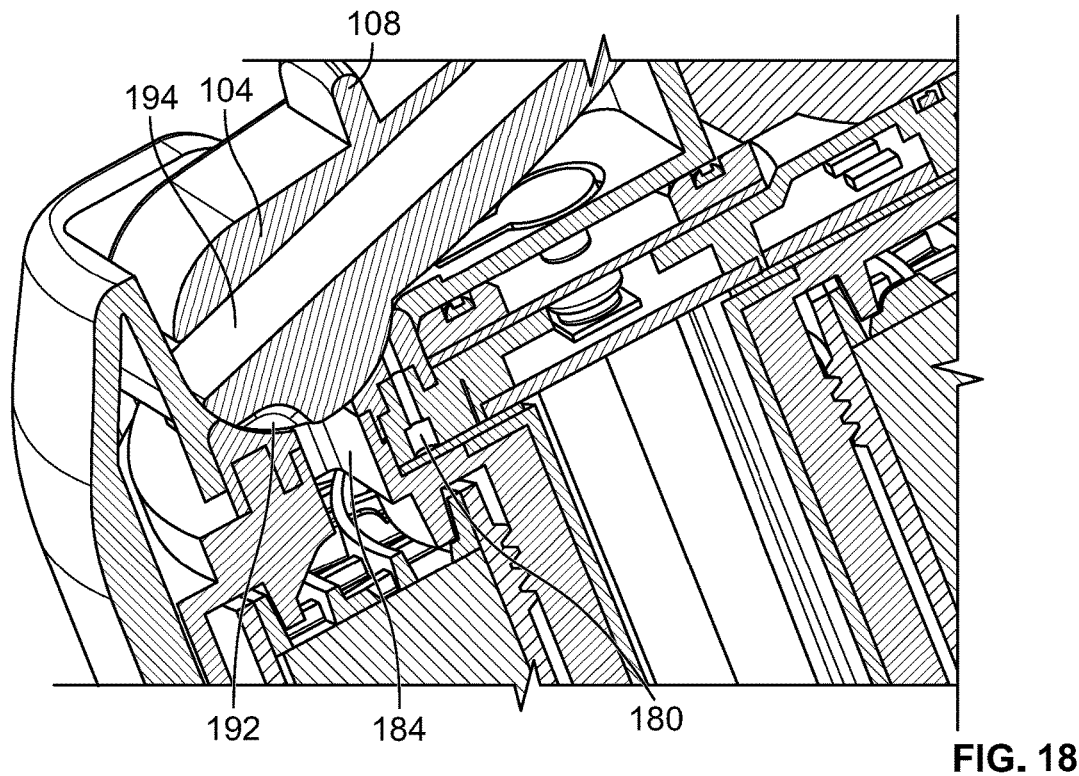
FIG. 18 shows an illustrative cutaway view of a portion of a cap in accordance with embodiments of the disclosure; the cutaway view shows a foldaway straw in a closed position.

FIG. 18 shows an illustrative partial cutaway view of the hybrid sterilization cap with the foldaway straw 104 in a closed position. As shown, flow pipe 194 is blocked from being connected to flow pipe 184. Also, vent hole 180 is blocked by foldaway straw 104. It should be appreciated that opening foldaway straw 104 opens an air lock and creates a vent via vent hole 180. Closing foldaway straw 104 is preferably designed to close vent hole 180.

Figure 19:
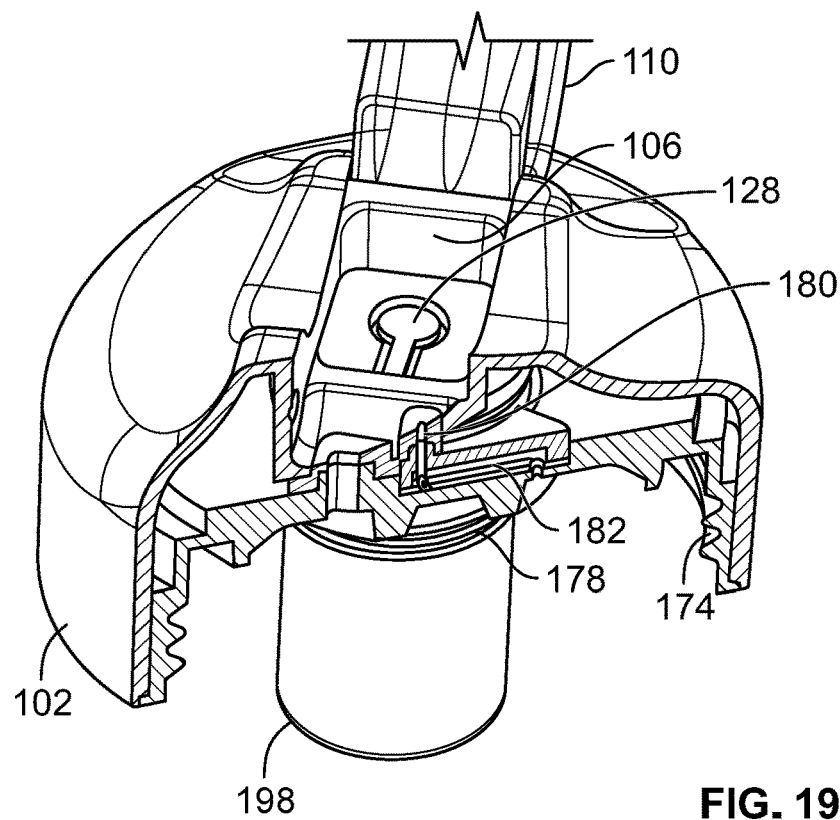
FIG. 19 shows an illustrative cutaway view of a portion of a cap in accordance with embodiments of the disclosure; the cutaway view does not show a cartridge.

FIG. 19 shows an illustrative partial cutaway view of elements of shell 102. It should be appreciated that the screwable cartridge cage is not shown in FIG. 19. As such, barrel 198 is shown.

Vent hole 180 is shown. Track for vent hole 182 may be a horizontal track that connects vent hole 180 to a location in the shell that accesses the contents of bottle 112.

Vent hole 180 may create a vent that provides a pathway between the outer surface of the shell and the inner surface of the shell when the foldaway straw is in an upright state. Vent hole being blocked when the foldaway straw is in a horizontal state. The width of vent hole 180 may be between 0.1 mm and 2 cm. The width of vent hole 180 may be between 0.5 mm and 5 mm. The length of the pathway between the outer surface of the shell and the inner surface of the shell may be between 0.1 mm and 2 cm. The length of the pathway between the outer surface of the shell and the inner surface of the shell may be between 0.5 mm and 1 cm.

Figure 20:
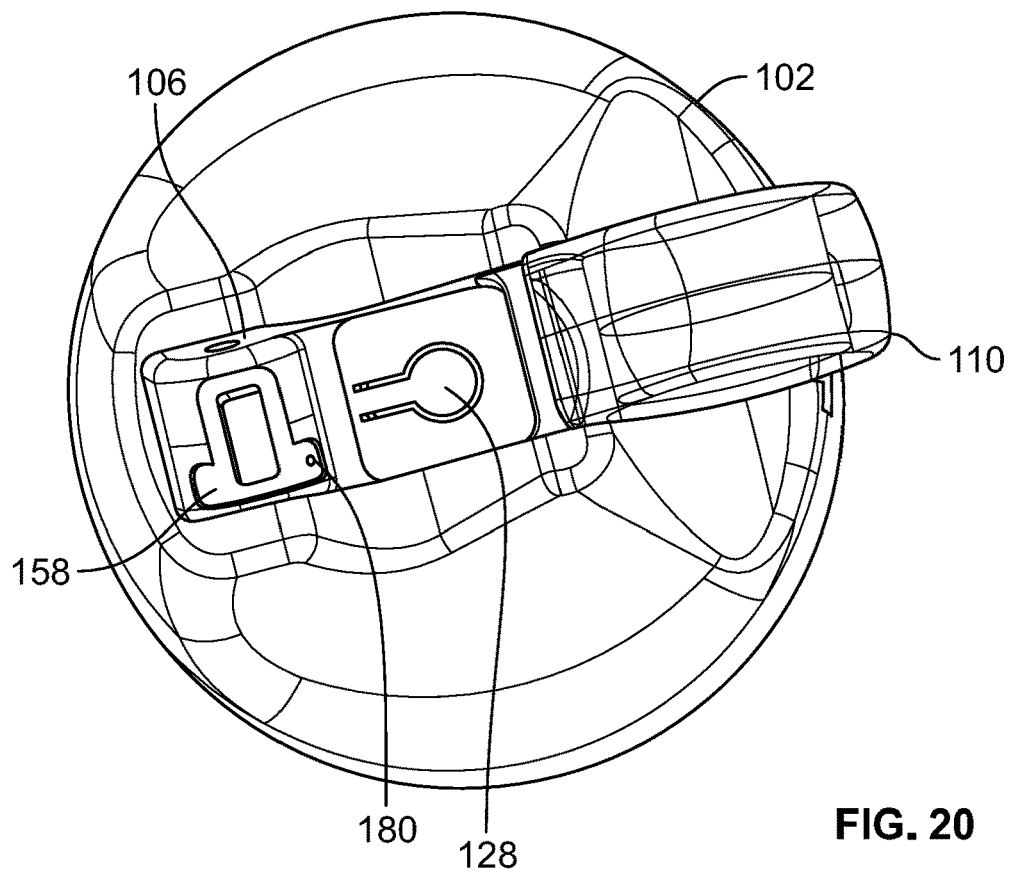
FIG. 20 shows an illustrative top view of a cap in accordance with embodiments of the disclosure; the top view does not show a foldaway straw.

FIG. 20 shows an illustrative partial view of elements of shell 102. In FIG. 20, element 158 is shown. Element 158 may be located underneath foldaway straw 104. Element 158 may include a portion of the flow pipe and the vent hole. Element 158 may connect the flow pipe and the vent hole on the upper portion of shell 102 to the flow pipe and vent hole in the inner portion of the shell 102.

Figure 21:
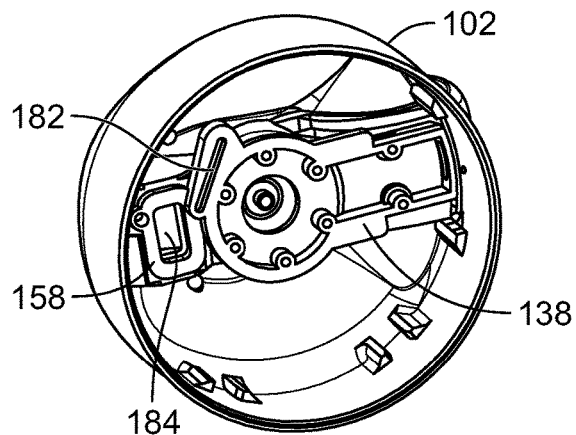
FIG. 21 shows an illustrative bottom perspective view of elements included in a cap in accordance with embodiments of the disclosure.

FIG. 21 shows another illustrative partial view of elements of shell 102. As shown, vent hole track 182 may be included on element 138, which may be above a PCB board element. Element 158, that connects the flow pipe and vent hole from the upper portion to the lower portion of shell 102 is shown.

Figure 22:
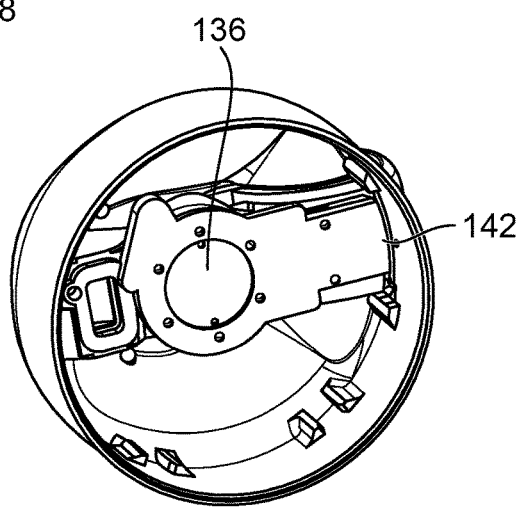
FIG. 22 shows another illustrative bottom perspective view of elements included in a cap in accordance with embodiments of the disclosure.

FIG. 22 shows another illustrative partial view of elements of shell 102. Gasket 142 is shown covering cylindrical plate 136 and above PCB board element 138.

Figure 23:
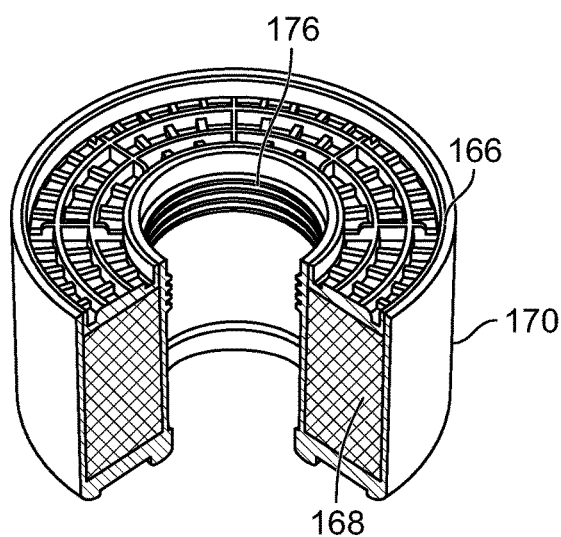
FIG. 23 shows an illustrative top perspective cutaway view of a cartridge included in a cartridge cage with a cartridge cage cover in accordance with embodiments of the disclosure.

FIG. 23 shows an illustrative partial top view of elements of the modular cartridge. The modular cartridge may include cartridge 170, cover to cartridge 166, inner portion cartridge 168 and threads 176. The cartridge may include one or more of the following properties: particulate filtering, chemical filtering, pH modifying, flavor-enhancing, flavor altering and any other suitable properties.

Figure 24:
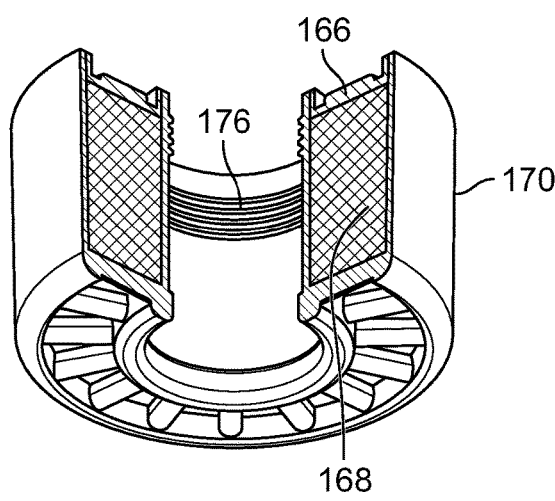
FIG. 24 shows an illustrative bottom perspective cutaway view of a cartridge included in a cartridge cage with a cartridge cage cover in accordance with embodiments of the disclosure.

FIG. 24 shows an illustrative partial bottom perspective view of the modular cartridge. The modular cartridge may include cartridge 170, cover to cartridge cage 166, inner portion of cartridge 168 and threads 176.

Figure 25:
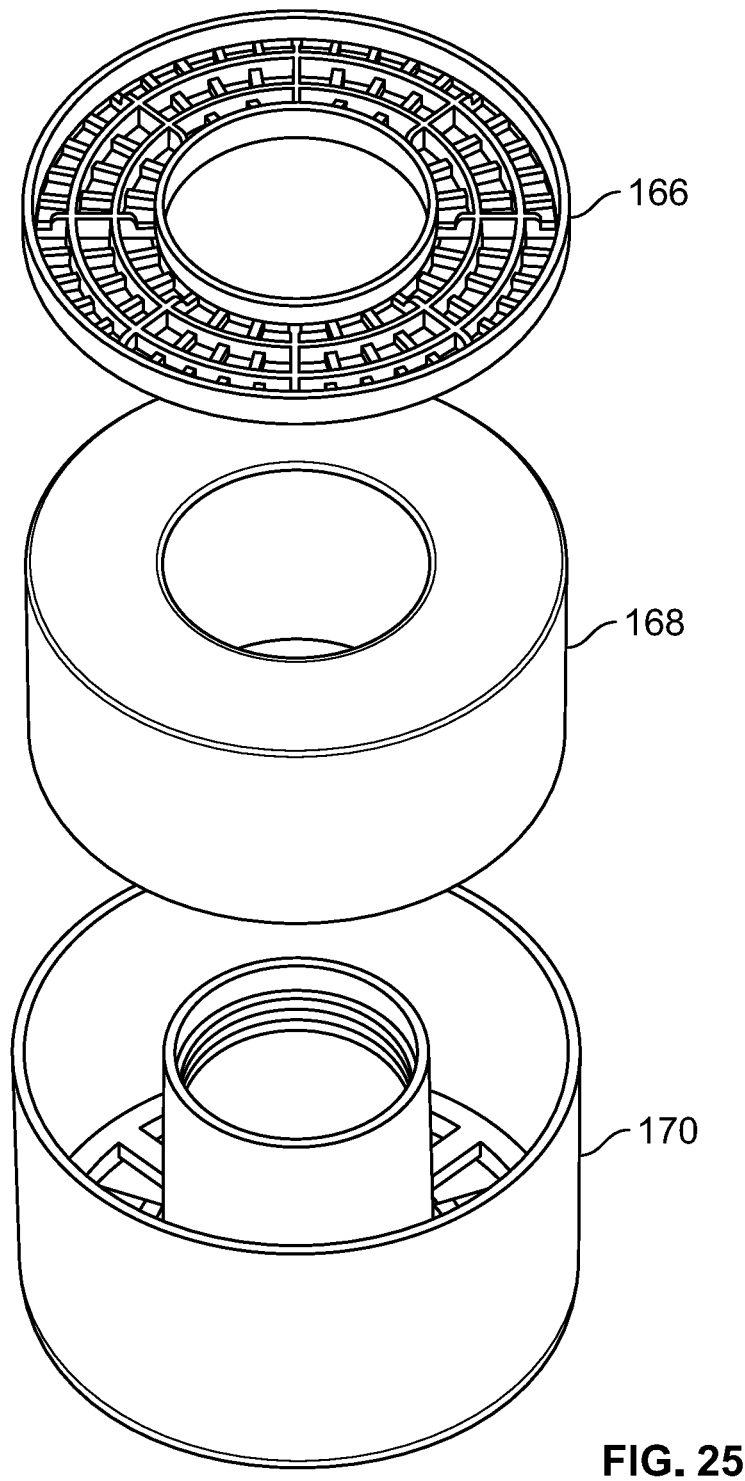
FIG. 25 shows an illustrative exploded view of a cartridge, a cartridge cage and a cartridge cage cover in accordance with embodiments of the disclosure.

FIG. 25 shows an illustrative exploded view of the modular cartridge. The modular cartridge may include cartridge cage 170, cover to cartridge cage 166 and inner portion of cartridge 168.

Figure 26:
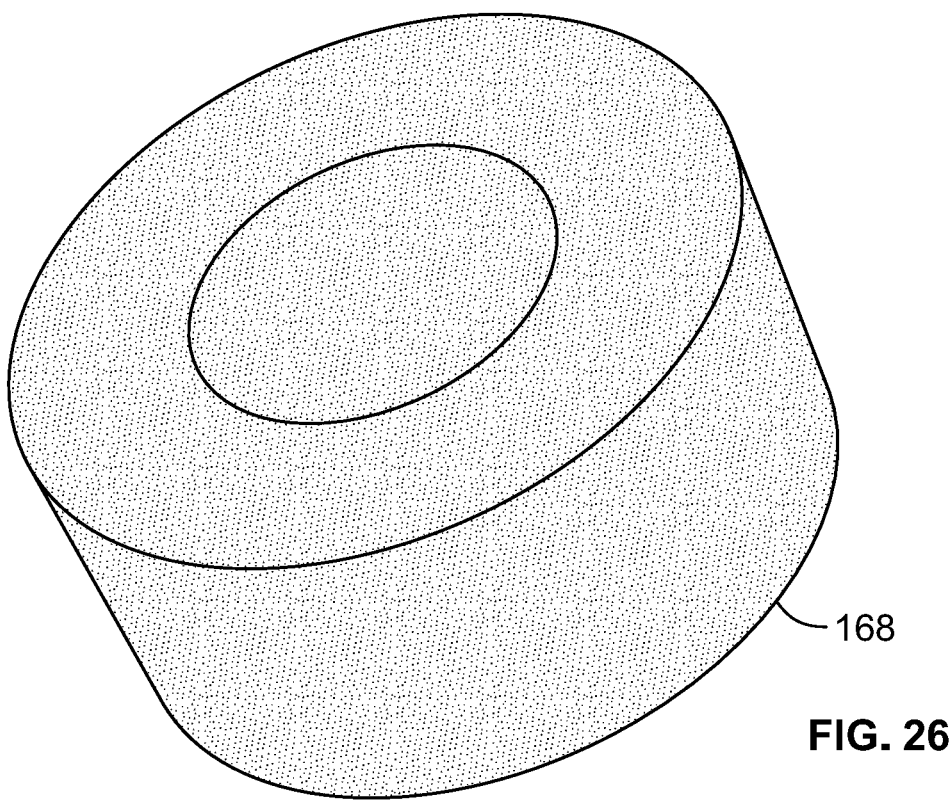
FIG. 26 shows an illustrative top perspective view of a cartridge in accordance with embodiments of the disclosure.

FIG. 26 shows an illustrative view of inner portion of cartridge 168. Inner portion of cartridge 168 may be a particulate filter. Inner portion of cartridge 168 may be replaceable or changeable. Inner portion of cartridge 168 may be customizable to the specific water that it is being used to filter. For example, the cartridge may filter the water from particulate matter, such as lead, chloride and fluoride. The cartridge may be disposable. The cartridge may filter certain particulate matter. For example, one cartridge may effectively remove lead from the water, while another cartridge may effectively remove chloride from the water. Yet another cartridge may be a universal filter that removes a variety of particulate matter.

In addition, the cartridge may include pH changing properties. For example, the cartridge may change the pH of a liquid passing therethrough. The cartridge may increase the pH of the drinking water in order enhance the alkalinity of the water.

In some embodiments, the sterilization cap and/or the cartridge may include a flavor-enhancing liquid reservoir. The flavor-enhancing liquid reservoir may infuse flavor into the water. The flavor infusion may occur through transfer of flavor from the flavor material into the water using dissolution, diffusion, osmosis or any other suitable manner. A user is sucking water through the foldaway straw may trigger the flavor infusion. In some embodiments, the reservoir may be refillable or disposable.

Figure 27:
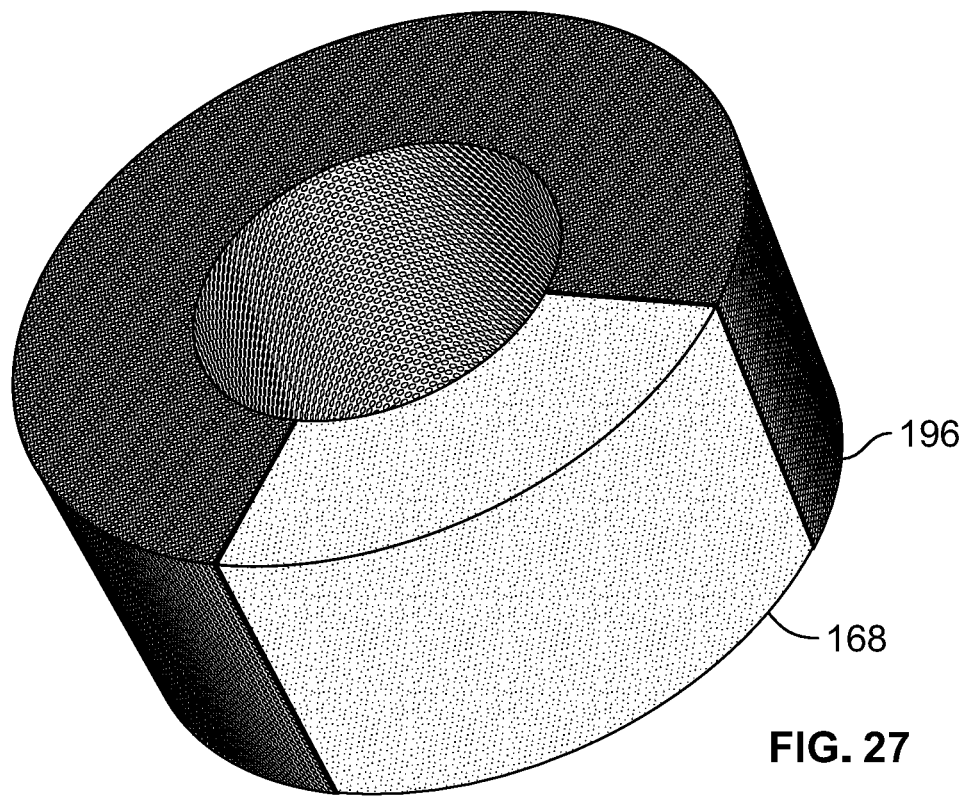
FIG. 27 shows an illustrative top perspective view of a cartridge partially covered by a mesh covering in accordance with embodiments of the disclosure.

FIG. 27 shows an illustrative view of inner portion of cartridge 168. In some embodiments, inner portion of cartridge 168 may be held together by mesh 196. Mesh 196 may surround the inner portion of cartridge 168.

Figure 28:
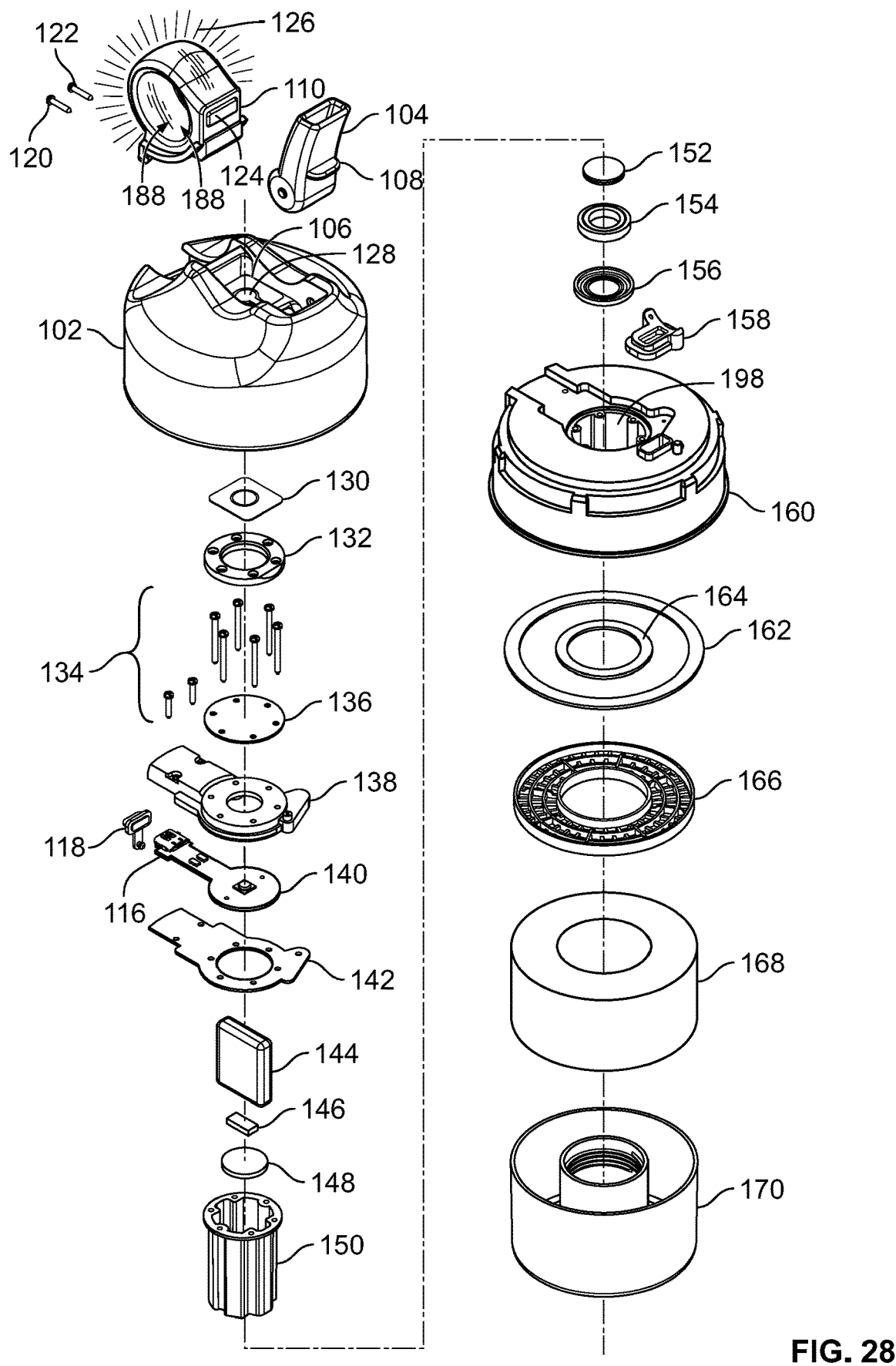
FIG. 28 shows an illustrative exploded view of a cap and a bottle in accordance with embodiments of the disclosure.
Figure 28:
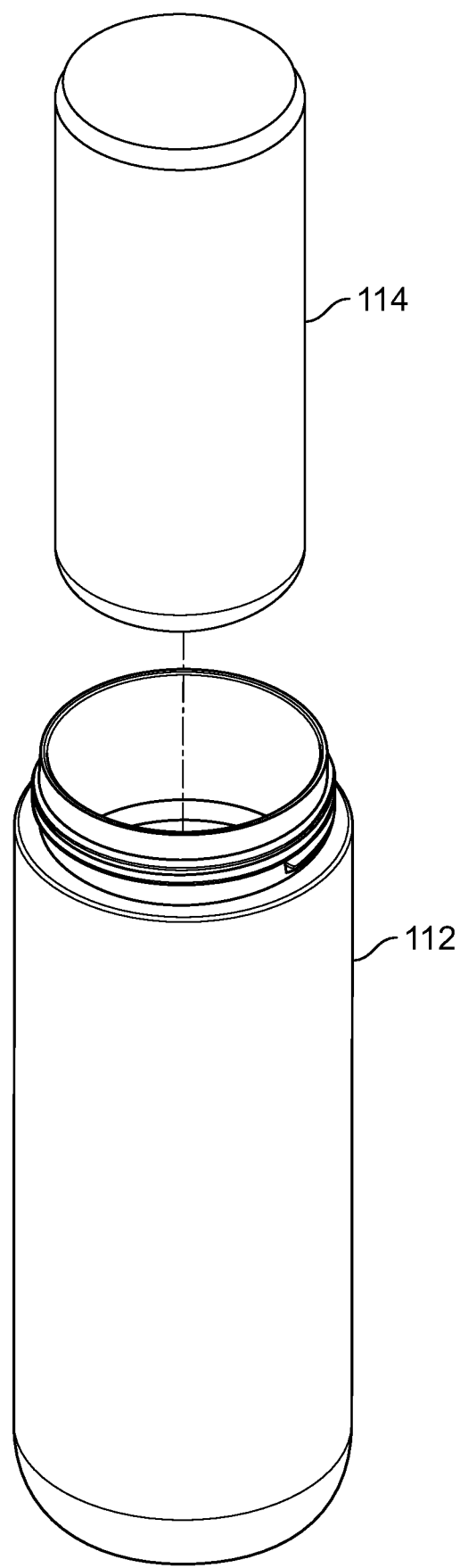

FIG. 28 shows an illustrative exploded view of components included in the hybrid sterilization cap and bottle.

The cap may include shell 102. Shell 102 may include foldaway straw 104. Foldaway straw 104 may include finger tab 108.

Shell 102 may include cavity 106. Cavity 106 may store foldaway straw 104 in a closed state. When foldaway straw 104 is an open state, button/touch sensor 128 may be visible.

Finger ring 110 may be screwed into shell 102 using screws 120 and 122. Locations 188 may be locations underneath finger ring 110, on shell 102, where LEDs are located. Illumination lines 126 show illumination of finger ring 110 when the LEDs located under locations 188 are turned on.

Component 130 may be LED ring that surrounds button/touch pad 128. Element 132 may be a cylindrical element. Screws 134 may screw into cylindrical plate 136, above PCB board element 138, PCB board 140 and gasket 142. Tab to cover micro-USB port 118 may cover micro-USB port 116 located on PCB board 140.

Battery 144 may be connected to PCB-A board 148 via connector 146. PCB pod—inner barrel 150 may be located within inner portion of cap 160 and barrel 198.

Quartz crystal 152 may be included in silicon portion of shield 154. Silicon portion of shield 154 may be covered by stainless-steel portion of shield 156.

Component with vent hold and flow pipe entry 158 is shown. Outer sealing o-ring 162 and inner sealing o-ring 1624 may be included on top of cartridge cage cover 166. Cartridge cage cover 166 may cover cartridge cage 170, which may include cartridge 168.

Inner portion of bottle 114 may sit inside bottle 112. The inner portion of the bottle 114 may provide insulating capabilities.

Thus, a sterilization cap with a removable cartridge is provided. Persons skilled in the art will appreciate that the present invention can be practiced by other than the described embodiments, which are presented for purposes of illustration rather than of limitation. The present invention is limited only by the claims that follow.

What is claimed is:

1. A water sanitization cap for covering a bottle, said cap comprising:
 a barrel, said barrel comprising a barrel outer surface;
 a shell, said shell surrounding at least a portion of said barrel, said shell comprising:
  a shell outer surface;
  a shell inner surface; and
  a cavity for a foldaway straw, said cavity comprising:
   at least three walls; and
   a floor;
 a waterproof compartment formed within the interior of the barrel, said waterproof compartment comprising one wall formed at least in part from a transparent material;

an ultraviolet-C light emitting diode ("UV-C LED"), said
UV-C LED:
  fixed within the waterproof compartment;
  proximal to one end of the barrel; and
  oriented to shine light through the transparent material;
a sensor, said sensor that, when activated, applies a voltage to the UV-C LED to cause the UV-C LED to emit light, a top of the sensor is disposed on the floor of the cavity;
a cartridge cage operable to hold a cartridge, said cartridge cage removably attachable to the inner surface of the shell or the outer surface of the barrel; and
the foldaway straw, the foldaway straw is maintained in either an upright state or in a horizontal state within the cavity.

2. The water sanitization cap of claim 1, further comprising:
a removably attachable finger ring, wherein the finger ring:
  comprises an outer portion and an inner portion, said inner portion comprising a reflective material;
  holds more than 50% of a load of the cap;
  is located on the outer surface of the shell;
  is fastened to the shell; and
  is comprised of transparent material; and
one or more light emitting diodes ("LEDs"), said LEDs, when turned on, operable to illuminate the finger ring.

3. The water sanitization cap of claim 2, further comprising a micro-USB charging site, said charging site located on the shell underneath the finger ring.

4. The water sanitization cap of claim 3, further comprising a flow pipe, said flow pipe connecting the foldaway straw, in the upright state, to an annular space between the cartridge cage and the barrel, said flow pipe forming a fluid pathway from the annular space to the foldaway straw.

5. The water sanitization cap of claim 4, further comprising a vent hole, said vent hole creating a vent that provides a pathway between the outer surface of the shell and the inner surface of the shell when the foldaway straw is in an upright state, said vent hole being blocked when the foldaway straw is in a horizontal state.

6. The water sanitization cap of claim 5, wherein a width of the vent hole is between 0.5 mm and 5 mm and the length of the vent pathway is between 0.5 mm and 1 cm.

7. The water sanitization cap of claim 5, wherein the shell further includes a track for the vent hole to open into the annular space.

8. The water sanitization cap of claim 7, further comprising a gasket, said gasket being shaped to fit over the track for the vent hole such that the gasket maintains a viability of the vent hole.

9. The water sanitization cap of claim 8, wherein:
the sensor fits into an aperture located on the floor of the cavity; and
the sensor is accessible when the foldaway straw is in the upright state.

10. A water sanitization cap for covering a bottle, said cap comprising:
a barrel, said barrel comprising an outer surface, said outer surface comprising a barrel threaded section;
a shell, said shell surrounding at least a portion of said barrel;
a waterproof compartment formed within the interior of the barrel, said waterproof compartment comprising an exterior surface including a side wall and an end wall, said end wall formed at least in part from a transparent material;
an ultraviolet-C light emitting diode ("UV-C LED"), said LED:
  fixed within the waterproof compartment;
  proximal to one end of the barrel; and
  oriented to shine light through the transparent material;
a sensor, said sensor that, when activated, applies a voltage to the UV-C LED to cause the UV-C LED to emit light; and
a cartridge cage operable to contain a cartridge, said cartridge cage comprising a cartridge cage threaded section, said cartridge cage threaded section for screwing into the barrel threaded section, said cartridge cage surrounding said side wall, wherein the waterproof compartment end wall is positioned relative to the cartridge cage such that the UV-C LED, in use, treats water within the bottle before the water flows through the cartridge cage.

11. The water sanitization cap of claim 10, wherein the cartridge comprises particulate filtering material, chemical filtering material, pH modifying material and/or flavor-enhancing material.

12. The water sanitization cap of claim 10, further comprising a stainless-steel shield, said stainless-steel shield shielding the barrel from light generated by the UV-C LED.

13. The water sanitization cap of claim 10, further comprising:
a finger ring, wherein the finger ring:
  comprises an outer portion and an inner portion, said inner portion comprising a reflective material;
  holds more than 50% of a load of the cap;
  is located on the outer surface of the shell;
  is fastened to the shell via one or more screws; and
  is comprised of transparent material; and
one or more light emitting diodes ("LEDs"), said LEDs located on the outer surface of the shell, said LEDs located underneath the finger ring, said LEDs, when turned on, operable to illuminate the finger ring.

14. The water sanitization cap of claim 13, further comprising a micro-USB charging site, said charging site being located on the shell underneath the finger ring.

15. The water sanitization cap of claim 13, wherein:
the shell further comprises a foldaway straw;
the foldaway straw is maintained in either an upright state or in a horizontal state, said foldaway straw that, when in said horizontal state, at least partially forms a plane that is perpendicular to a longitudinal axis of the bottle; and
the sensor is located underneath the foldaway straw when the foldaway straw is in the horizontal state; and
the sensor is accessible when the foldaway straw is in the upright state.

16. The water sanitization cap of claim 15, further comprising:
a flow pipe, said flow pipe that connects the foldaway straw, in the upright state, to an annular space between the cartridge cage and the barrel, said flow pipe that forms a fluid pathway from the annular space to the foldaway straw; and
a vent hole, said vent hole creating a vent that provides a pathway between the outer surface of the shell and the inner surface of the shell when the foldaway straw is in an upright state, said vent hole being blocked when the foldaway straw is in a horizontal state.

17. The water sanitization cap of claim 16, wherein the shell further includes a track for the vent hole to open into the annular space.

18. The water sanitization cap of claim 17, further comprising a gasket, said gasket being shaped to fit over the track for the vent hole such that the gasket maintains a viability of the vent hole.

19. A water sanitization cap for covering a bottle, said cap comprising:
- a barrel, said barrel comprising an outer surface;
- a shell, said shell surrounding at least a portion of said barrel, said shell comprising a shell threaded section;
- a waterproof compartment formed within an interior of the barrel, said waterproof compartment comprising one wall formed at least in part from a transparent material;
- an ultraviolet-C light emitting diode ("UV-C LED"), said LED:
  - fixed within the waterproof compartment;
  - proximal to one end of the barrel; and
  - oriented to shine light through the transparent material;
- a sensor, said sensor that, when activated, applies a voltage to the UV-C LED to cause the UV-C LED to emit light; and
- a cartridge cage operable to contain a cartridge, said cartridge cage comprising a cartridge cage threaded section, said cartridge cage threaded section for screwing into the shell threaded section on an inner surface of the shell, the cartridge cage threaded section and the shell threaded section being complimentary to one another, wherein the waterproof compartment wall is positioned relative to the cartridge cage such that the UV-C LED, in use, treats water within the bottle before the water flows through the cartridge cage.

20. The water sanitization cap of claim 19, wherein the sensor is integrated, using a pressure-fit, into the shell.

* * * * *